(12) United States Patent
Min et al.

(10) Patent No.: US 9,801,133 B2
(45) Date of Patent: Oct. 24, 2017

(54) APPARATUS, SYSTEM AND METHOD OF COMMUNICATING A WAKEUP PACKET RESPONSE

(71) Applicant: INTEL CORPORATION, Santa Clara, CA (US)

(72) Inventors: Alexander W. Min, Portland, OR (US); Minyoung Park, Portland, OR (US); Shahrnaz Azizi, Cupertino, CA (US)

(73) Assignee: INTEL CORPORATION, Santa Clara, CA (US)

( * ) Notice: Subject to any disclaimer, the term of this patent is extended or adjusted under 35 U.S.C. 154(b) by 51 days.

(21) Appl. No.: 14/864,917

(22) Filed: Sep. 25, 2015

(65) Prior Publication Data

US 2016/0374018 A1    Dec. 22, 2016

Related U.S. Application Data

(60) Provisional application No. 62/180,161, filed on Jun. 16, 2015.

(51) Int. Cl.
*G08C 17/00*    (2006.01)
*H04W 52/02*    (2009.01)
(Continued)

(52) U.S. Cl.
CPC ....... *H04W 52/0229* (2013.01); *H04L 5/0007* (2013.01); *H04W 76/046* (2013.01);
(Continued)

(58) Field of Classification Search
CPC .......... H04W 76/046; H04W 72/1263; H04W 72/1289; H04W 72/1257; H04W 72/0453;
(Continued)

(56) References Cited

U.S. PATENT DOCUMENTS

2009/0285163 A1* 11/2009 Zhang ................. H04W 72/042
    370/329
2010/0054168 A1*  3/2010 Igarashi .............. H04W 72/005
    370/312

(Continued)

OTHER PUBLICATIONS

IEEE Std 802.11™-2012. IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012, 2793 pages.

(Continued)

*Primary Examiner* — Ian N Moore
*Assistant Examiner* — Phong La
(74) *Attorney, Agent, or Firm* — Shichrur & Co.

(57) ABSTRACT

Some demonstrative embodiments include apparatuses, devices, systems and methods of a wakeup packet response. For example, an apparatus may include circuitry configured to cause a first wireless device to generate a wakeup packet including a wakeup response policy field to indicate a response policy; and to transmit the wakeup packet to a wakeup receiver of a second wireless device over a wakeup Resource Unit (RU) allocation of an Orthogonal Frequency Division Multiple Access (OFDMA) structure.

25 Claims, 10 Drawing Sheets

(51) Int. Cl.
*H04L 5/00* (2006.01)
*H04W 76/04* (2009.01)
*H04W 74/00* (2009.01)
*H04W 92/18* (2009.01)

(52) U.S. Cl.
CPC .......... *H04W 74/002* (2013.01); *H04W 92/18* (2013.01); *Y02B 60/50* (2013.01)

(58) Field of Classification Search
CPC ........... H04W 72/0413; H04W 84/042; H04W 84/02; H04W 84/12; H04W 52/0203; H04W 52/02; H04W 5/0007; H04W 52/0229
See application file for complete search history.

(56) References Cited

U.S. PATENT DOCUMENTS

| | | | |
|---|---|---|---|
| 2010/0115130 A1* | 5/2010 | Jun | H04L 12/12 709/242 |
| 2011/0268004 A1 | 11/2011 | Doppler et al. | |
| 2012/0119902 A1* | 5/2012 | Patro | H04L 12/12 340/502 |
| 2014/0092824 A1* | 4/2014 | He | H04W 52/0258 370/329 |
| 2014/0105084 A1* | 4/2014 | Chhabra | H04W 52/0209 370/311 |
| 2014/0126442 A1 | 5/2014 | Jafarian et al. | |
| 2015/0131517 A1* | 5/2015 | Chu | H04W 72/005 370/312 |
| 2015/0286507 A1* | 10/2015 | Elmroth | G06F 11/3442 718/104 |
| 2015/0334650 A1* | 11/2015 | Park | H04W 52/0209 370/311 |
| 2015/0365922 A1 | 12/2015 | Suh et al. | |
| 2016/0113034 A1* | 4/2016 | Seok | H04W 74/04 370/329 |
| 2016/0150505 A1 | 5/2016 | Hedayat | |
| 2016/0198240 A1* | 7/2016 | Kim | H04N 7/08 725/33 |
| 2016/0212702 A1* | 7/2016 | Ghosh | H04W 52/0216 |
| 2016/0227565 A1* | 8/2016 | Ghosh | H04W 72/1268 |
| 2016/0227579 A1* | 8/2016 | Stacey | H04W 74/0833 |
| 2016/0249303 A1* | 8/2016 | Kenney | H04W 24/08 |
| 2016/0302185 A1* | 10/2016 | Sun | H04W 74/08 |
| 2016/0323426 A1* | 11/2016 | Hedayat | H04L 69/324 |
| 2016/0330714 A1* | 11/2016 | Hedayat | H04W 72/1289 |
| 2016/0345349 A1* | 11/2016 | Ferdowsi | H04W 72/1268 |
| 2016/0353435 A1* | 12/2016 | Ghosh | H04W 72/0446 |
| 2016/0359598 A1 | 12/2016 | Montreuil et al. | |
| 2017/0094600 A1 | 3/2017 | Min et al. | |
| 2017/0111858 A1 | 4/2017 | Azizi et al. | |

OTHER PUBLICATIONS

U.S. Appl. No. 14/998,242, filed Dec. 26, 2015, 63 pages.
Wi-Fi Peer-to-Peer (P2P), Technical Specification, Version 1.5, 2014, Aug. 4, 2014, 183 pages.
Office Action for U.S. Appl. No. 141998,242, dated on May 19, 2017, 54 pages.

* cited by examiner

APPARATUS, SYSTEM AND METHOD OF COMMUNICATING A WAKEUP PACKET RESPONSE

CROSS REFERENCE

This Application claims the benefit of and priority from U.S. Provisional Patent Application No. 62/180,161 entitled "Apparatus, System And Method Of Wakeup Packet Response", filed Jun. 16, 2015, the entire disclosure of which is incorporated herein by reference.

TECHNICAL FIELD

Embodiments described herein generally relate to communicating a wakeup packet response.

BACKGROUND

Some computing devices, for example, small computing devices, such as, for example, wearable devices and/or sensors, are constrained by a small battery capacity.

However, such devices may be required to support wireless communication technologies such as, for example, Wi-Fi, and/or Bluetooth (BT), for example, to connect to other computing devices, e.g., a Smartphone, for example, to exchange data.

Exchanging data using the wireless communication technologies may consume power of the battery, and it may be beneficial, or even critical, to minimize energy consumption of one or more communication blocks in such computing devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
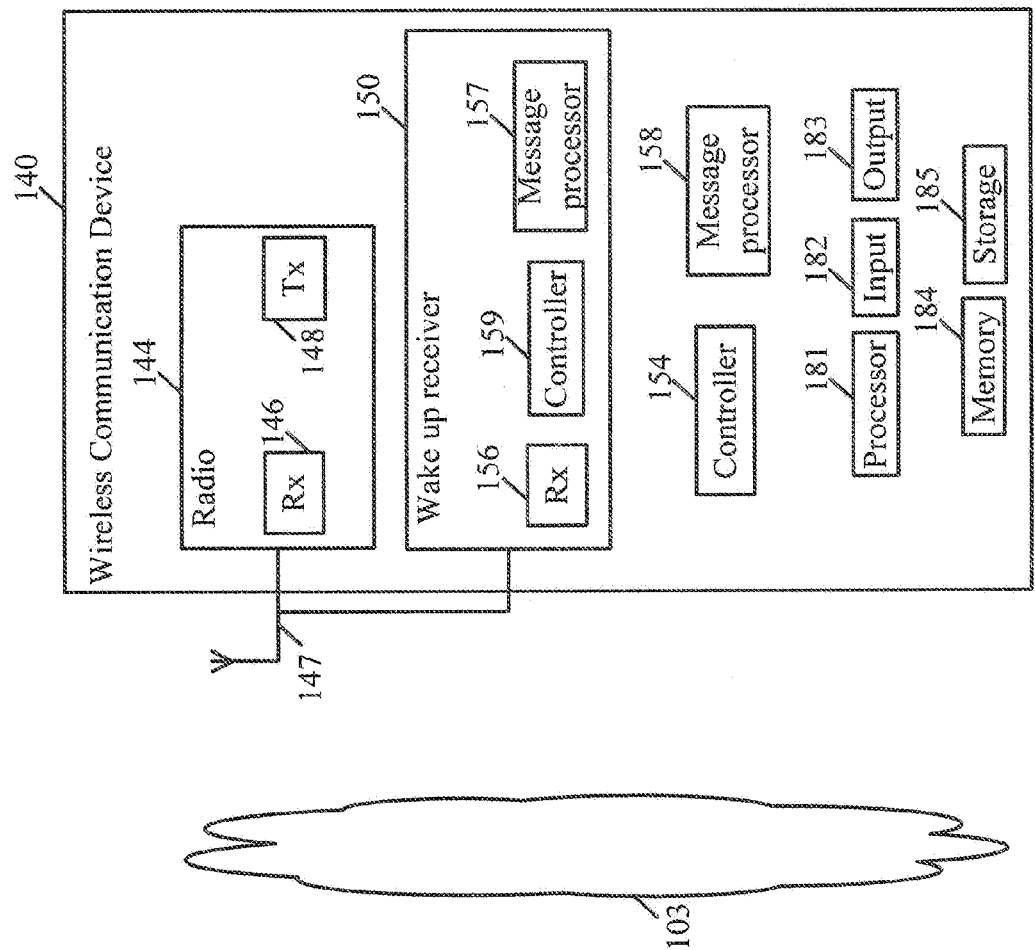
FIG. 1 is a schematic block diagram illustration of a system, in accordance with some demonstrative embodiments.

In the following detailed description, numerous specific details are set forth in order to provide a thorough understanding of some embodiments. However, it will be understood by persons of ordinary skill in the art that some embodiments may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one embodiment", "an embodiment", "demonstrative embodiment", "various embodiments" etc., indicate that the embodiment(s) so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some embodiments may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, an Internet of Things (IoT) device, a sensor device, a wearable device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing IEEE 802.11 standards (including IEEE 802.11-2012 (IEEE 802.11-2012, *IEEE Standard for Information technology—Telecommunications and information exchange between systems Local and metropolitan area networks—Specific requirements Part 11: Wireless LAN Medium Access Control (MAC) and Physical Layer (PHY) Specifications*, Mar. 29, 2012); IEEE802.11ac-2013 ("IEEE P802.11 ac-2013, *IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 4: Enhancements for Very High Throughput for Operation in Bands below 6 GHz*", December, 2013); IEEE 802.11ad ("*IEEE P802.11ad-2012, IEEE Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band*", 28 Dec. 2012); IEEE-802.11REVmc ("*IEEE 802.11-REVmc™/D3.0, June 2014 draft standard for Information technology—Telecommunications and information exchange between systems Local and metropolitan area networks Specific requirements; Part 11: Wireless LAN Medium Access Control (MAC) and Physical Layer (PHY) Specification*"); IEEE 802.11ax (*IEEE 802.11ax, High Efficiency WLAN (HEW)*); IEEE802.11-ay (*P802.11 ay Standard for Information Technology—Telecommunications and Information Exchange Between Systems Local and Metropolitan Area Networks—Specific Requirements Part 11: Wireless LAN Medium Access Control (MAC) and Physical Layer (PHY) Specifications—Amendment: Enhanced Throughput for Operation in License-Exempt Bands Above 45 GHz*)) and/or future versions and/or derivatives thereof) and/or future versions and/or derivatives thereof, devices and/or networks operating in accordance with existing Wireless-Gigabit-Alliance (WGA) specifications (*Wireless Gigabit Alliance, Inc WiGig MAC and PHY Specification Version 1.1, April 2011, Final specification*) and/or future versions and/or derivatives thereof, devices and/or networks operating in accordance with existing Wireless Fidelity (WiFi) Alliance (WFA) Peer-to-Peer (P2P) specifications (*WiFi P2P technical specification, version 1.5, Aug. 4, 2014*) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, devices and/or networks operating in accordance with existing Bluetooth (BT) specifications and/or protocols and/or future versions and/or derivatives thereof, units and/or devices which are part of the above networks, and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems, for example, Radio Frequency (RF), Infrared (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other embodiments may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative embodiments, a wireless device may be or may include a peripheral that is integrated with a computer, or a peripheral that is attached to a computer. In some demonstrative embodiments, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device.

As used herein, the term "circuitry" may refer to, be part of, or include, an Application Specific Integrated Circuit (ASIC), an integrated circuit, an electronic circuit, a processor (shared, ted, or group), and/or memory (shared, dedicated, dedica or group), that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Some demonstrative embodiments may be used in conjunction with a WLAN, e.g., a WiFi network. Other embodiments may be used in conjunction with any other suitable wireless communication network, for example, a wireless area network, a "piconet", a WPAN, a WVAN and the like.

The term "antenna", as used herein, may include any suitable configuration, structure and/or arrangement of one or more antenna elements, components, units, assemblies and/or arrays. In some embodiments, the antenna may implement transmit and receive functionalities using separate transmit and receive antenna elements. In some embodiments, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative embodiments.

As shown in FIG. 1, in some demonstrative embodiments, system 100 may include one or more wireless communication devices. For example, system 100 may include a first wireless communication device 102, and/or a second wireless communication device 140.

In some demonstrative embodiments, device 102 and/or device 140 may include a mobile device or a non-mobile, e.g., a static, device. For example, device 102 and/or device 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a wearable device, a BT device, a handheld device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative embodiments, device 102 and/or device 140 may include, operate as, and/or perform the functionality of one or more STAs. For example, device 102 may include at least one STA, and/or device 140 may include at least one STA.

In some demonstrative embodiments, device 102 and/or device 140 may include, operate as, and/or perform the functionality of one or more WLAN STAs.

In some demonstrative embodiments, device 102 and/or device 140 may include, operate as, and/or perform the functionality of one or more Wi-Fi STAs.

In some demonstrative embodiments, device 102 and/or device 140 may include, operate as, and/or perform the functionality of one or more BT devices.

In some demonstrative embodiments, device 102 and/or device 140 may include, operate as, and/or perform the functionality of one or more Neighbor Awareness Networking (NAN) STAs.

In some demonstrative embodiments, device 102 and/or device 140 may include, operate as, and/or perform the functionality of one or more location measurement STAs.

In one example, a station (STA) may include a logical entity that is a singly addressable instance of a medium access control (MAC) and physical layer (PHY) interface to the wireless medium (WM). The STA may perform any other additional or alternative functionality.

In some demonstrative embodiments, device 102 and/or device 140 may include, operate as, and/or perform the functionality of any other devices and/or STAs.

In some demonstrative embodiments, devices 102 and/or 140 may be configured to operate as, and/or to perform the functionality of, an access point (AP), and/or a personal basic service set (PBSS) control point (PCP), for example, an AP/PCP STA.

In some demonstrative embodiments, devices 102 and/or 140 may be configured to operate as, and/or to perform the functionality of, a non-AP STA, and/or a non-PCP STA, for example, a non-AP/PCP STA.

In one example, an AP may include an entity that contains a station (STA), e.g., one STA, and provides access to distribution services, via the wireless medium (WM) for associated STAs. The AP may perform any other additional or alternative functionality.

In one example, a personal basic service set (PBSS) control point (PCP) may include an entity that contains a STA, e.g., one station (STA), and coordinates access to the wireless medium (WM) by STAs that are members of a PBSS. The PCP may perform any other additional or alternative functionality.

In one example, a PBSS may include a directional multi-gigabit (DMG) basic service set (BSS) that includes, for example, one PBSS control point (PCP). For example, access to a distribution system (DS) may not be present, but, for example, an intra-PBSS forwarding service may optionally be present.

In one example, a PCP/AP STA may include a station (STA) that is at least one of a PCP or an AP. The PCP/AP STA may perform any other additional or alternative functionality.

In one example, a non-AP STA may include a STA that is not contained within an AP. The non-AP STA may perform any other additional or alternative functionality.

In one example, a non-PCP STA may include a STA that is not a PCP. The non-PCP STA may perform any other additional or alternative functionality.

In one example, a non PCP/AP STA may include a STA that is not a PCP and that is not an AP. The non-PCP/AP STA may perform any other additional or alternative functionality.

In one example, device 102 may be configured to operate as, and/or to perform the functionality of the AP, and/or device 140 may be configured to operate as, and/or to perform the functionality of a non-PCP/AP STA.

In some demonstrative embodiments, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Device 102 and/or device 140 may optionally include other suitable additional or alternative hardware components and/or software components. In some demonstrative embodiments, some or all of the components of one or more of device 102 and/or device 140 may be enclosed in a common housing or packaging, and may be interconnected or operably associated using one or more wired or wireless links. In other embodiments, components of one or more of device 102 and/or device 140 may be distributed among multiple or separate devices.

In some demonstrative embodiments, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multipurpose or specific processor or controller. Processor 191 executes instructions, for example, of an Operating System (OS) of device 102 and/or of one or more suitable applications. Processor 181 executes instructions, for example, of an Operating System (OS) of device 140 and/or of one or more suitable applications.

In some demonstrative embodiments, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative embodiments, memory unit 194 and/or memory unit 184 may include, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative embodiments, wireless communication device 102 and/or device 140 may be capable of communicating content, data, information and/or signals via a wireless medium (WM) 103. In some demonstrative embodiments, wireless medium 103 may include, for example, a radio channel, a cellular channel, an RF channel, a WiFi channel, an IR channel, a Bluetooth (BT) channel, a Global Navigation Satellite System (GNSS) Channel, and the like.

In some demonstrative embodiments, WM 103 may include a channel over a 2.4 Gigahertz (GHz) frequency band, a channel over a 5 GHz frequency band, a channel over a millimeterWave (mmWave) frequency band, e.g., a 60 GHz frequency band, a channel over a sub 1 Gigahertz (S1G) frequency band, and/or any other channel over any other band.

In some demonstrative embodiments, device 102 and/or device 140 may include one or more radios including circuitry and/or logic to perform wireless communication between devices 102, 140 and/or one or more other wireless communication devices. For example, device 102 may include at least one radio 114, and/or device 140 may include at least one radio 144.

In some demonstrative embodiments, radios 114 and/or 144 may include one or more wireless receivers (Rx) including circuitry and/or logic to receive wireless communication signals, RF signals, frames, blocks, transmission streams, packets, messages, data items, and/or data. For example, radio 114 may include at least one receiver 116, and/or radio 144 may include at least one receiver 146.

In some demonstrative embodiments, radios 114 and/or 144 may include one or more wireless transmitters (Tx) including circuitry and/or logic to transmit wireless communication signals, RF signals, frames, blocks, transmission streams, packets, messages, data items, and/or data. For example, radio 114 may include at least one transmitter 118, and/or radio 144 may include at least one transmitter 148.

In some demonstrative embodiments, radio 114, radio 144, transmitter 118, transmitter 148, receiver 116, and/or receiver 148 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative embodiments, radios 114 and/or 144 may include, or may be associated with, one or more antennas 107 and/or 147, respectively.

In one example, device 102 may include a single antenna 107. In another example, device 102 may include two or more antennas 107.

In one example, device 140 may include a single antenna 147. In another example, device 140 may include two or more antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. Antennas 107 and/or 147 may include, for example, antennas suitable for directional communication, e.g., using beamforming techniques. For example, antennas 107 and/or 147 may include a phased array antenna, a multiple element antenna, a set of switched beam antennas, and/or the like. In some embodiments, antennas 107 and/or 147 may implement transmit and receive functionalities using separate transmit and receive antenna elements. In some embodiments, antennas 107 and/or 147 may implement transmit and receive functionalities using common and/or integrated transmit/receive elements.

In some demonstrative embodiments, device 102 may include a controller 124, and/or device 140 may include a controller 154. Controllers 124 and/or 154 may be configured to perform one or more communications, may generate and/or communicate one or more messages and/or transmissions, and/or may perform one or more functionalities, operations and/or procedures between devices 102, and/or 140 and/or one or more other devices, e.g., as described below.

In some demonstrative embodiments, controllers 124 and/or 154 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein.

In some demonstrative embodiments, device 102 may include a message processor 128 configured to generate, process and/or access one or messages communicated by device 102.

In one example, message processor 128 may be configured to generate one or more messages to be transmitted by device 102, and/or message processor 128 may be configured to access and/or to process one or more messages received by device 102, e.g., as described below.

In some demonstrative embodiments, device 140 may include a message processor 158 configured to generate, process and/or access one or messages communicated by device 140.

In one example, message processor 158 may be configured to generate one or more messages to be transmitted by device 140, and/or message processor 158 may be configured to access and/or to process one or more messages received by device 140, e.g., as described below.

In some demonstrative embodiments, message processors 128 and/or 158 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative embodiments, at least part of the functionality of message processor 128 may be implemented as part of radio 114, and/or at least part of the functionality of message processor 158 may be implemented as part of radio 144.

In some demonstrative embodiments, at least part of the functionality of message processor 128 may be implemented as part of controller 124, and/or at least part of the functionality of message processor 158 may be implemented as part of controller 154.

In other embodiments, the functionality of message processor 128 may be implemented as part of any other element of device 102, and/or the functionality of message processor 158 may be implemented as part of any other element of device 140.

In some demonstrative embodiments, at least part of the functionality of controller 124 and/or message processor 128 may be implemented by an integrated circuit, for example, a chip, e.g., a System on Chip (SoC). In one example, the chip or SoC may be configured to perform one or more functionalities of radio 114. For example, the chip or SoC may include one or more elements of controller 124, one or more elements of message processor 128, and/or one or more elements of radio 114. In one example, controller 124, message processor 128, and radio 114 may be implemented as part of the chip or SoC.

In other embodiments, controller 124, message processor 128 and/or radio 114 may be implemented by one or more additional or alternative elements of device 102.

In some demonstrative embodiments, device 102 and/or device 140 may include a wearable device, a sensor, small device, a mobile device, and/or any other device, which may be, for example, powered by a battery and/or any other power source having a limited capacity.

In some demonstrative embodiments, device 102 and/or device 140 may support wireless communication technologies such as, for example, Wi-Fi, Bluetooth (BT), and/or any other additional or alternative technology, for example, to connect between device 102, device 140, and/or other wireless devices.

In some demonstrative embodiments, device 140 may include a wearable device and/or a sensor device powered by a power source having a limited capacity, e.g., a small battery.

In some demonstrative embodiments, device 140 may be configured to communicate data with another device, e.g., device 102, which may be less power constrained than device 140, for example, a Smartphone.

In some demonstrative embodiments, communicating data between device 102 and device 140 may consume power of the power source of device 140.

In some demonstrative embodiments, minimizing energy consumption of one or more communication blocks, modules and/or elements of device 140 may be beneficial, and in some cases, even critical, for example, in order to reduce and/or minimize power consumption of the power source of device 140.

In some demonstrative embodiments, power consumption of device 140 may be reduced, e.g., minimized, for example, by powering off one or more communication blocks, modules and/or elements of device 140, e.g., as much as possible, for example, while maintaining data transmission and/or reception capabilities of device 140, e.g., without substantially increasing latency and/or degrading quality of data communication.

In one example, one or more communication blocks, modules and/or elements of device 140 may be powered on and/or may be woken up, for example, only when there is data to transmit, and/or only when there is data to receive. According to this example, the one or more communication blocks, modules and/or elements of device 140 may be powered off and/or switched to a sleep mode, for example, for the rest of the time.

For example, one or more elements of radio 144 may be powered on and/or may be woken up, for example, only when device 140 has data to transmit, and/or only when device 140 has data to receive. According to this example, one or more elements of radio 144 may be powered off and/or switched to the sleep mode, for example, for the rest of the time.

In some demonstrative embodiments, device 140 may include a wakeup receiver 150 configured to power on and/or to wakeup radio 144 of device 140.

In some demonstrative embodiments, wakeup receiver 150 may wakeup radio 144, for example, based on a packet, e.g., a wakeup packet, received from another device, e.g., device 102, which is, for example, to transmit data to device 140.

In some demonstrative embodiments, wakeup receiver 150 may include a receiver 156 configured to receive the wakeup packet.

In some demonstrative embodiments, wakeup receiver 150 may include circuitry and/or logic configured to receive, decode, demodulate, and/or process the wakeup packet.

In some demonstrative embodiments, receiver 156 may include circuitry; logic; Radio Frequency (RF) elements, circuitry and/or logic; baseband elements, circuitry and/or logic; demodulation elements, circuitry and/or logic; amplifiers; analog to digital converters; filters; and/or the like.

In some demonstrative embodiments, wakeup receiver 150 may include a controller 159 configured to control one or more operations and/or functionalities of wakeup receiver 150, e.g., for processing the wakeup packet and/or waking up radio 144. For example, controller 159 may be configured to control a power supply of radio 144, and/or any other mechanism to wakeup radio 144, e.g., upon determining that a wakeup packet has been received by wakeup receiver 150.

In some demonstrative embodiments, controller 159 may be configured to perform one or more communications, to generate and/or communicate one or more messages and/or transmissions, and/or to perform one or more functionalities, operations and/or procedures, e.g., as described below.

In some demonstrative embodiments, controller 159 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of controller 159. Additionally or alternatively, one or more functionalities of controller 159 may be implemented by logic, which may be executed by a machine and/or one or more processors, e.g., as described below.

In one example, controller 159 may include circuitry and/or logic, for example, one or more processors including circuitry and/or logic, to cause a wireless device, e.g., device 140, and/or a wireless station, e.g., a wireless STA implemented by device 140, to perform one or more operations, communications and/or functionalities, e.g., as described herein.

In some demonstrative embodiments, wakeup receiver 150 may include a message processor 157 configured to process and/or access one or messages communicated by wakeup receiver 150.

In some demonstrative embodiments, message processor 157 may be configured to process one or more wakeup packets received by wakeup receiver 150, and/or to indicate to controller 159 that a wakeup packet is received.

In one example, message processor 157 may be configured to access, process, demodulate and/or decode reception of the wakeup packets by a wireless station, e.g., a wireless STA implemented by device 140.

In some demonstrative embodiments, message processor 157 may include circuitry and/or logic, e.g., one or more processors including circuitry and/or logic, memory circuitry and/or logic, Media-Access Control (MAC) circuitry and/or logic, Physical Layer (PHY) circuitry and/or logic, and/or any other circuitry and/or logic, configured to perform the functionality of message processor 157. Additionally or alternatively, one or more functionalities of message processor 157 may be implemented by logic, which may be executed by a machine and/or one or more processors, e.g., as described below.

In some demonstrative embodiments, at least part of the functionality of message processor 157 may be implemented as part of message processor 158.

In some demonstrative embodiments, at least part of the functionality of message processor 157 may be implemented as part of any other element of wakeup receiver 150. For example, at least part of the functionality of message processor 157 may be implemented as part of receiver 156 and/or controller 159.

In some demonstrative embodiments, at least part of the functionality of receiver 156, controller 159 and/or message processor 157 may be implemented by an integrated circuit, for example, a chip, e.g., a System on Chip (SoC). In one example, the chip or SoC may be configured to perform one or more functionalities of radio 144, controller 154 and/or message processor 158. For example, the chip or SoC may include one or more elements of controller 159, one or more elements of message processor 157, and/or one or more elements of receiver 156, one or more elements of radio 144, one or more elements of message processor 158, and/or one or more elements of controller 154. In one example, wakeup receiver 150, message processor 158, controller 154, and/or radio 144 may be implemented as part of the chip or SoC.

In other embodiments, radio 144, wakeup receiver 150, controller 154 and/or message processor 158 may be implemented by one or more additional or alternative elements of device 140.

In some demonstrative embodiments, wakeup receiver 150 may be associated with one or more of antennas 147, e.g., which may be shared with radio 144.

In other embodiments, wakeup receiver 150 may include, or may be associated with, another, e.g., separate, antenna.

In some demonstrative embodiments, wakeup receiver 150 may be configured to wakeup radio 144, for example, if device 140 has data to transmit, and/or if data is to be received by radio 144.

In one example, wakeup receiver 150 may be configured to implement a low-power wakeup receiver (LP-WUR) scheme, for example, to wakeup radio 144, e.g., only when device 140 is to receive data and/or to transmit data.

In some demonstrative embodiments, the LP-WUR scheme, may introduce a power save mode ("LP-WUR mode"), for example, to an IEEE 802.11 Specification, e.g., as described below.

In some demonstrative embodiments, a device including an LP-WUR ("LP-WUR STA") may be configured to enter a mode ("LP-WUR mode"), e.g., in which the device is to turn off or power down a radio, e.g., an 802.11 radio, and operate the LP-WUR to wait for a wakeup packet.

In one example, device 140 including wakeup receiver 150 may be configured to enter the LP-WUR mode, in which the device 140 is to turn off or power down radio 144 radio and operate wakeup receiver 150 to wait for a wakeup packet.

In some demonstrative embodiments, wakeup receiver 150 may have, for example, a relatively low power consumption, e.g., less than 100 microwatts. Accordingly, the power consumption of device 140 may be reduced for example, during times when there is no data to be received at device 140 and only wakeup receiver 150 is on.

In some demonstrative embodiments, wakeup receiver 150 may wakeup radio 144, for example, based on a wakeup packet received from device 102.

In one example, receiver 156 may be configured to receive the wakeup packet from device 102, message processor 156 may be configured to process the wakeup packet, and/or controller 159 may be configured to wakeup radio 144.

In some demonstrative embodiments, device 102 may be configured to transmit the wakeup packet to device 140, for example, to indicate to wakeup receiver 150 that the radio 144 is to be woken up, e.g., to receive data from device 102.

In some demonstrative embodiments, controller 159 may be configured to cause radio 144 to wakeup, e.g., to switch to an active mode, for example, to receive data from device 102, e.g., subsequent to receiving the wakeup packet from device 102.

In some demonstrative embodiments, controller 159 may be configured to cause, control and/or trigger radio 144 to wakeup, e.g., to switch to an active mode, for example, to transmit data to device 102 and/or to another device.

In some demonstrative embodiments, devices 102 and/or 140 may be configured to communicate according to an Orthogonal Frequency-Division Multiplexing (OFDM) communication scheme, e.g., as described below.

For example, radio 114, radio 144 and/or wakeup receiver 150 may be configured to communicate according to the OFDM communication scheme.

In some demonstrative embodiments, devices 102 and/or 140 may be configured to communicate a wakeup packet over an Orthogonal Frequency Multiple Access (OFDMA) channel, e.g., as described below.

In some demonstrative embodiments, communication over the OFDMA channel may be performed in accordance with an IEEE 802.11 Specification, for example, an IEEE 802.11ax Specification, and/or any other specification and/or protocol.

In some demonstrative embodiments, an OFDMA communication scheme may be configured, for example, to increase and/or improve spectrum efficiency, e.g., in dense environments, for example, compared to non-OFDMA schemes, e.g., in accordance with IEEE 802.11 ac and/or IEEE 802.11 ah Standards, for example, compared to the OFDM scheme.

In some demonstrative embodiments, device 102 and/or device 140 may be configured to implement a transceiver structure for an LP-WUR, which may be, for example, compatible with the OFDMA communication scheme, e.g., in accordance with an IEEE 802.11ax Specification.

For example, radio 124, radio 144 and/or wakeup receiver 150 may be configured to communicate according to the OFDMA communications scheme.

In some demonstrative embodiments, device 102 and/or device 140 may be configured to communicate according to an OFDMA scheme, in which a STA, e.g., each STA, may be allocated a portion of an OFDMA channel bandwidth ("OFDMA sub-channel"), e.g., compared to the OFDM scheme, in which each STA may be allocated the entire channel bandwidth.

In some demonstrative embodiments, the OFDMA sub channel (also referred to as "sub band") may include a set of OFDM sub-carriers (also referred to as "tones").

In some demonstrative embodiments, device 102 may be configured to transmit in an OFDMA sub-channel a wakeup packet to one or more other devices, ("LP-WUR devices"), which may be equipped with a LP-WUR.

In some demonstrative embodiments, device 140, may be configured to receive and process the wakeup packet in an OFDMA sub-channel.

In some demonstrative embodiments, device 102 may be configured to allocate an OFDMA sub-channel (also referred to as "Resource Unit (RU)", for example, to communicate the wakeup packet.

In some demonstrative embodiments, a dedicated OFDMA sub-band (also referred to as "the wakeup RU allocation") may be used for a wakeup packet transmission, for example, such that the wakeup packet may be transmitted, for example, simultaneously with other downlink (DL) traffic, thus fully benefiting from OFDMA, and/or enhancing spectrum efficiency.

In some demonstrative embodiments, controller 124 may be configured to cause, control and/or trigger device 102 to allocate at least one OFDMA RU, which may be dedicated and/or scheduled, for example, to be used as the wakeup RU allocation for the transmission of the wakeup packet, e.g., instead of data packets, e.g., a data packet according to an IEEE 802.11ax Specification.

In some demonstrative embodiments, controller 124 may be configured to cause, control and/or trigger device 102 to transmit a wakeup packet in the wakeup RU allocation, and/or controller 154 and/or controller 159 may be configured to cause, control and/or trigger device 140 to process a wakeup packet received in the wakeup RU allocation, e.g., as described below.

In some demonstrative embodiments, the wakeup RU allocation may include one or more sub-bands located at the center of the OFDMA channel.

In some demonstrative embodiments, controller 124 may be configured to cause, control and/or trigger device 102 to allocate one or more sub-bands at the center of the OFDMA channel (the wakeup RU allocation), e.g., for the transmission of the wakeup packet.

In some demonstrative embodiments, one or more other sub-bands, e.g., of the OFDMA channel, which may not be located at the center of the OFDMA channel, may be used for data packet transmissions, for example, to other wireless devices and/or users, e.g., as described below with reference to FIG. 2.

Figure 2:
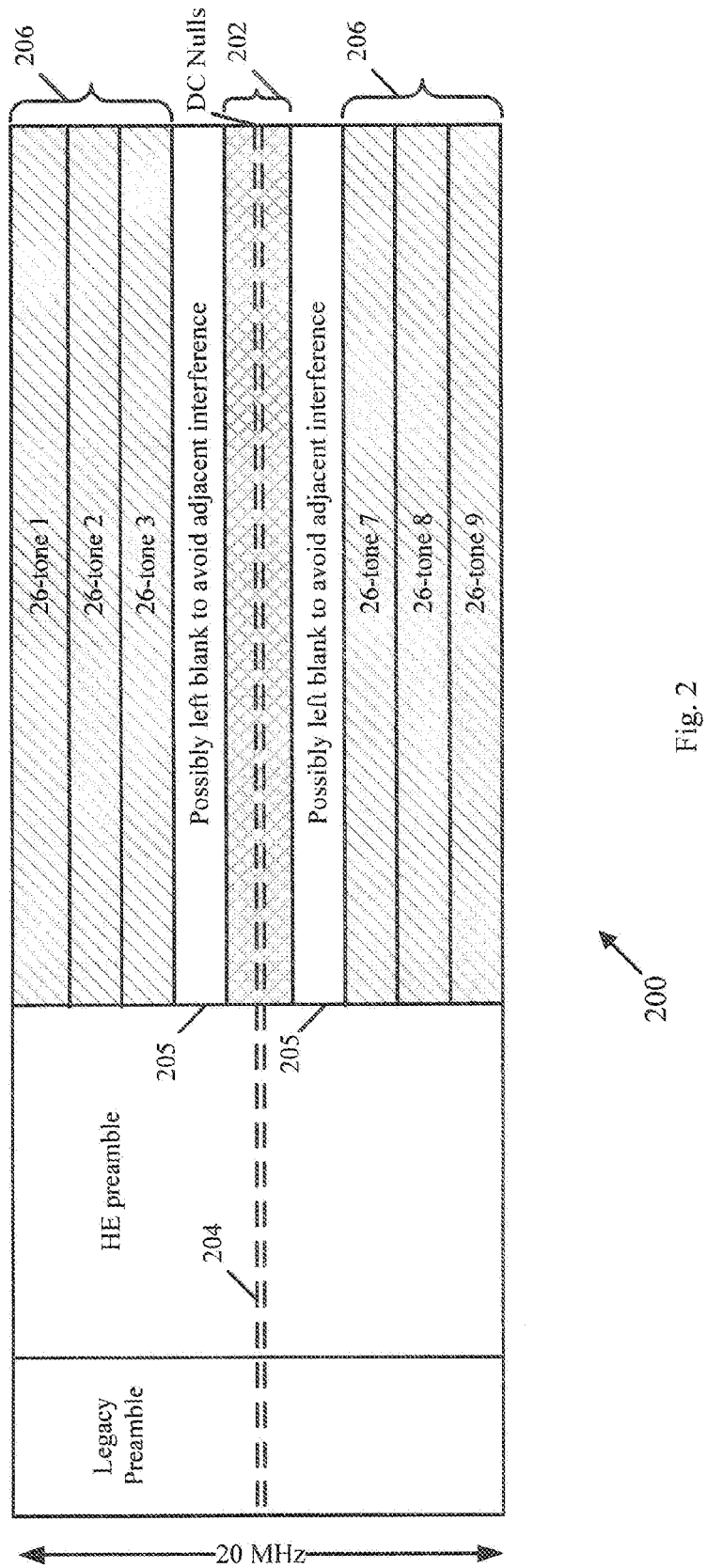
FIG. 2 is a schematic illustration of an Orthogonal Frequency Division Multiple Access (OFDMA) downlink (DL) structure, in accordance with some demonstrative embodiments.

Reference is made to FIG. 2, which schematically illustrates an OFDMA DL structure 200, in accordance with some demonstrative embodiments.

In some demonstrative embodiments, OFDMA DL structure 200 may be, for example, in accordance with an IEEE 802.11ax OFDMA DL transmission scheme.

In some demonstrative embodiments, OFDMA DL structure 200 may be used for transmission of a wakeup packet.

In one example, devices 102 and 140 (FIG. 1) may communicate the wakeup packet transmission, for example, according to OFDMA DL structure 200.

In some demonstrative embodiments, as shown in FIG. 2, one or more sub-bands 202 located at the center of OFDMA DL structure 200, e.g., around Direct Current (DC) tones 204, may be allocated for the wakeup packet transmission.

In some demonstrative embodiments, as shown in FIG. 2, one or more sub-bands 206, e.g., the rest of sub-bands of OFDMA DL structure 200, may be used for data packet transmissions, e.g., for one or more other users.

In some demonstrative embodiments, as shown in FIG. 2, at least two sub-channels 205, e.g., adjacent to the one or more sub-bands 202, may, optionally, not be assigned to any transmission, e.g., to avoid adjacent interference, for example, between a wakeup transmission, e.g., over sub-bands 202, and data packets transmissions, e.g., over sub-bands 206.

Referring back to FIG. 1, in some demonstrative embodiments, a wireless device ("wakeup Transmitter (Tx) STA"), e.g., device 102, transmitting a wakeup packet to a wakeup receiver (Rx) STA, e.g., device 140, of the wakeup packet, may be configured to receive a response frame, e.g., a Power-save (PS) Poll (PS-Poll), a trigger frame, or any other response frame, from the intended device, for example, within a certain period of time.

For example, the response frame from the wakeup Rx STA, e.g., device 140, may indicate to the sender of the wakeup packet whether the wakeup packet was received correctly, and/or whether a radio of the wakeup Rx STA is awake and ready to receive data from the wakeup Tx STA.

In some demonstrative embodiments, a wakeup Rx STA, e.g., device 140, may be configured to transmit a response to the wakeup packet, for example, after reception of the wakeup packet, e.g., by the wakeup Rx STA.

In some demonstrative embodiments, a wakeup Rx STA, e.g., device 140, may be configured to transmit the response to the wakeup packet, for example, over an OFDMA structure, e.g., simultaneously with other users of the OFDMA structure.

In one example, devices 102 and/or 140 may be configured to communicate the response to the wakeup packet over an OFDMA structure, e.g., in accordance with the IEEE 802.11ax Specification.

In some demonstrative embodiments, a wakeup Rx STA, e.g., device 140, may be configured to transmit the response to the wakeup packet, for example, over an OFDM structure, for example, a legacy OFDM structure, e.g., a stand alone packet occupying the entire channel bandwidth, for example, separate from any other users of the OFDMA structure.

In some demonstrative embodiments, a wakeup Rx STA, e.g., device 140, may be configured to select not to respond to the wakeup packet.

In some demonstrative embodiments, devices 102 and/or 140 may be configured to communicate the response to the wakeup packet according to a policy ("wakeup response policy") for responding to the wakeup packet.

In some demonstrative embodiments, a wakeup Tx STA, e.g., device 102, may be configured to transmit the wakeup response policy to a wakeup Rx STA, e.g., device 140.

In some demonstrative embodiments, the wakeup Rx STA, device 140, may be configured to receive the wakeup response policy from the wakeup Tx STA.

In some demonstrative embodiments, the wakeup response policy may be configured to indicate to the wakeup Rx STA, e.g., device 140, whether the wakeup Rx STA is to wait for a trigger frame, e.g., a trigger frame that contains resource allocation information for the OFDMA frame structure to be used by the wakeup Rx STA to respond back to the sender of the wakeup packet, e.g., device 102.

In some demonstrative embodiments, the wakeup response policy may be configured to indicate to the wakeup Rx STA, e.g., device 140, to use a legacy OFDM packet structure, for example, to respond back to the sender of the wakeup packet, e.g., device 102.

In some demonstrative embodiments, the wakeup response policy may be configured to indicate to the wakeup Rx STA, e.g., device 140, that the wakeup Rx STA is not required to respond to the wakeup packet.

In some demonstrative embodiments, the sender of the wakeup packet, e.g., device 102, may be configured to include and/or embed wakeup response policy information in the wakeup packet, e.g., as described below.

In some demonstrative embodiments, the wakeup response policy information may be configured to indicate to the recipient of the wakeup packet, e.g., device 140, if and how to respond to the wakeup packet, e.g., as described below.

In some demonstrative embodiments, controller 124 may control, cause and/or trigger device 102 to generate a wakeup packet including a wakeup response policy field to indicate a response policy to be used for selectively responding to the wakeup packet, e.g., as described below.

In some demonstrative embodiments, controller 124 may control, cause and/or trigger device 102 to transmit the wakeup packet to wakeup receiver 150 of device 140 over a wakeup RU allocation of an OFDMA structure.

In some demonstrative embodiments, controller 124 may control, cause and/or trigger message processor 128 to generate the wakeup packet including the wakeup response policy field indicating the response policy, and/or controller 124 may control, cause and/or trigger transmitter 118 to transmit the wakeup packet to device 140.

In some demonstrative embodiments, the wakeup response policy field may include wakeup response policy information, e.g., as described below.

In some demonstrative embodiments, the wakeup response policy information may be configured to indicate a first policy (an "OFDMA packet response policy"), for example, in which device 140 is to wait for a trigger frame that contains a response RU allocation of the OFDMA structure to be used for transmitting the response to device 102, e.g., as described below.

In some demonstrative embodiments, the wakeup response policy information may be configured to indicate a second policy (an "OFDM packet response policy"), for example, in which device 140 is to use a legacy OFDM packet structure to transmit the response packet back to device 102, e.g., as described below.

In some demonstrative embodiments, the wakeup response policy information may be configured to indicate a third policy (a "no response policy"), for example, in which 140 does not need to respond to the wakeup packet from device 102.

In some demonstrative embodiments, device 140 may receive from device 102 the wakeup packet including the wakeup response policy field indicating the response policy.

In some demonstrative embodiments, controller 159 may control, cause and/or trigger wakeup receiver 150 to process the wakeup packet including the wakeup response policy field.

In some demonstrative embodiments, controller 159 may control, cause and/or trigger message processor 157 to process, decode, and/or access the received wakeup packet including the wakeup response policy field.

In some demonstrative embodiments, controller 159 and/or controller 154 may control, cause and/or trigger device 140 to selectively transmit a response to device 102, for example, according to the response policy, e.g., as described below.

In some demonstrative embodiments, the response may include a Power Save (PS) Poll frame, a data frame, or a Null data frame.

In some demonstrative embodiments, controller 159 may control, cause and/or trigger device 140 to wakeup radio 144 to communicate data with device 102.

In some demonstrative embodiments, device 102 and/or device 140 may communicate data, for example, after radio 144 is woken up.

In some demonstrative embodiments, device 102 and/or device 140 may be configured to communicate the wakeup packet according to a wakeup packet structure, e.g., as described below with reference to FIG. 3.

Figure 3:
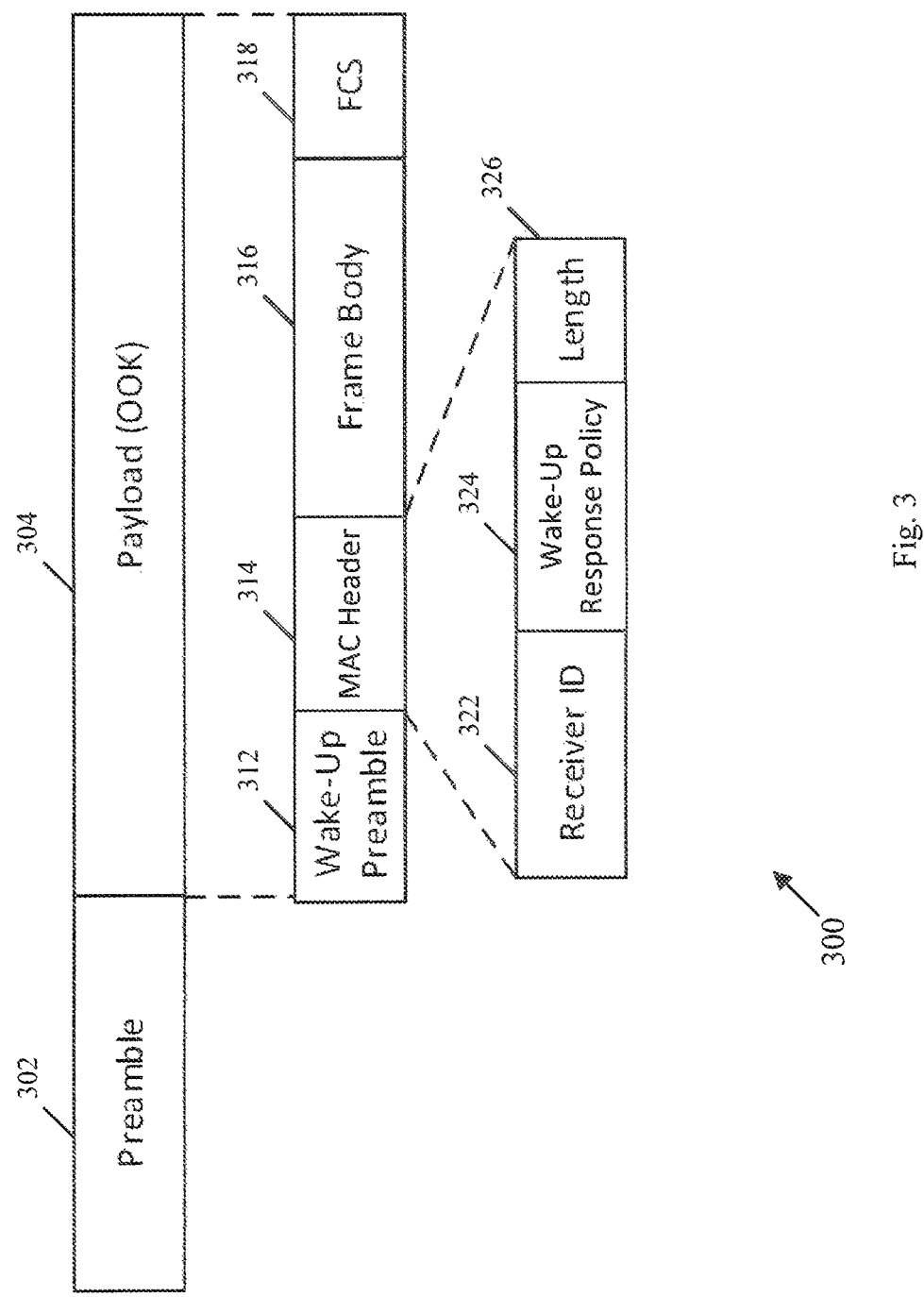
FIG. 3 is a schematic illustration of wakeup packet structure, in accordance with some demonstrative embodiments.

Reference is made to FIG. 3, which schematically illustrates a structure of wakeup packet 300, in accordance with some demonstrative embodiments.

For example, device 102 (FIG. 1) may be configured to generate and/or transmit wakeup packet 300; and/or device 140 (FIG. 1) may be configured to process wakeup packet 300.

In some demonstrative embodiments, as shown in FIG. 3, wakeup packet 300 may include a preamble 302, for example, in accordance with a preamble structure defined by the IEEE 802.11 ax Specification, or any other preamble.

In some demonstrative embodiments, as shown in FIG. 3, wakeup packet 300 may include a payload 304.

In some demonstrative embodiments, payload 304 may be modulated by a simple modulation scheme, for example, an On-off Keying (OOK) modulation scheme.

Some demonstrative embodiments are described herein with respect to an OOK modulation scheme. However, in other embodiments wakeup packet 300 may include a payload 304 modulated according to any other Amplitude-Shift Keying (ASK) modulation scheme, a Frequency Shift Keying (FSK) modulation scheme, and/or any other modulation scheme.

In some demonstrative embodiments, payload 304 may include an OOK modulated wakeup packet preamble 312.

In some demonstrative embodiments, as shown in FIG. 3, payload 304 may include a Media Access Control (MAC) header 314.

In some demonstrative embodiments, as shown in FIG. 3, payload 304 may include a frame body field 316.

In some demonstrative embodiments, as shown in FIG. 3, payload 304 may include a Frame Check Sequence (FCS) field 318, for example, including a Cyclic Redundancy Check (CRC) value, e.g. a CRC-8 value or a CRC-16 value, for example, of MAC Header field 314 and the Frame Body field 316.

In some demonstrative embodiments, as shown in FIG. 3, MAC header field 314 may include a Receiver Identifier (ID) 322, which may include, for example, address information of a wakeup Rx STA to receive wakeup packet 300, e.g., device 140 (FIG. 1).

In some demonstrative embodiments, the address information may include, for example, a MAC address of the wakeup Rx STA, which is to receive wakeup packet 300, a partial MAC address of the wakeup Rx STA, a hashed value of the MAC addresses of the wakeup Rx STA and the sender of wakeup packet 300, e.g., device 102 (FIG. 1), and/or any other value to indicate the wakeup Rx STA to receive wakeup packet 300.

In some demonstrative embodiments, as shown in FIG. 3, MAC header field 314 may include a Length field 326, for example, to indicate the length of the frame body field 316.

In some demonstrative embodiments, as shown in FIG. 3, MAC header field 314 may include a wakeup response policy field 324, for example, to indicate the wakeup response policy to be applied for responding to wakeup packet 300, e.g., as described below.

In some demonstrative embodiments, the wakeup response policy field 324 may be set to a value selected from three predefined values, for example, to indicate a selected response policy from three respective response policies, e.g., as described below.

In other embodiments, the wakeup response policy field 324 may be set to any other value, e.g., selected from any other number of values, and/or to indicate any other number and/or types of policies.

In some demonstrative embodiments, wakeup response policy field 324 may be set to a first value, e.g., "0", to indicate the OFDMA packet response policy, e.g., as described below.

In some demonstrative embodiments, wakeup response policy field 324 may be set to a second value, e.g., "1", to indicate the OFDM packet response policy, e.g., as described below.

In some demonstrative embodiments, wakeup response policy field 324 may be set to a third value, e.g., "2", to indicate the no response policy, e.g., as described below.

Referring back to FIG. 1, in some demonstrative embodiments, device 102 may process an indication that device 140 is at a sleep mode.

In some demonstrative embodiments, controller 124 may control, cause and/or trigger device 102 to generate a wakeup packet, e.g., wakeup packet 300, to wakeup device 140.

In some demonstrative embodiments, the wakeup packet may include a value to indicate that the OFDMA packet response policy is to be used to transmit a response to the wakeup packet. For example, the wakeup packet may include the first value "0" in the wakeup response policy field 324 (FIG. 3).

In some demonstrative embodiments, the wakeup packet may include a response RU allocation of the OFDMA structure for transmission of the response to the wakeup packet. For example, the wakeup packet may include the response RU allocation in frame body field 316 (FIG. 3).

In one example, the response RU allocation may include sub-band allocation information of the OFDMA structure, for example, to indicate the response RU allocation, e.g., to be used for transmission of the response.

In some demonstrative embodiments, the wakeup packet may include trigger timing information to indicate a time for transmission of a trigger frame to trigger the response. For example, the wakeup packet may include the trigger timing information in frame body field 316 (FIG. 3).

In one example, the trigger timing information may be configured to indicate a time, denoted T, at which the trigger frame is scheduled to be transmitted, for example, to enable wakeup receiver 150 of device 140 to wakeup the radio 144 of device 140 to receive the trigger frame, for example, just before the trigger frame transmission.

In some demonstrative embodiments, controller 124 may control, cause and/or trigger device 102 to transmit the wakeup packet including the OFDMA packet response policy over the wakeup RU allocation of the OFDMA structure.

In some demonstrative embodiments, device 140 may receive from device 102 the wakeup packet including the OFDMA packet response policy, the response RU allocation, and the trigger timing information.

In some demonstrative embodiments, controller 124 may control, cause and/or trigger device 102 to transmit the trigger frame to device 140, for example, based on the trigger timing information.

In one example, device 140 may be configured to wait for the trigger frame, e.g., at the time T. Upon reception of the trigger frame, device 140 may decode the sub-band allocation information in the trigger frame, and may transmit a response frame, for example, using the sub-band allocated to device 140 in the OFDMA structure.

In some demonstrative embodiments, radio 144 may receive the trigger frame from device 102.

In some demonstrative embodiments, controller 159 may control, cause and/or trigger radio 144 to transmit the response frame, e.g., in response to the trigger frame.

In some demonstrative embodiments, device 140 may be configured to use the OFDMA packet structure to transmit a response frame, e.g., simultaneously with other users in a single OFDMA packet, for example, according to the OFDMA packet response policy.

In some demonstrative embodiments, controller 159 may control, cause and/or trigger radio 144 to transmit the response over the response RU allocation of the OFDMA structure, e.g., the response RU allocation indicated in frame body field 316 (FIG. 3).

In some demonstrative embodiments, device 102 may receive the response frame, e.g., over the response RU allocation of the OFDMA structure.

In some demonstrative embodiments, device 102 may be aware that device 140 received the wakeup packet, and that radio 144 is awake, for example, based on the response from device 140, and device 102 may be able to communicate data with device 140.

In some demonstrative embodiments, controller 124 may control, cause and/or trigger device 102 to retransmit the wakeup packet to device 140, for example, when the response frame is not received from device 140.

In some demonstrative embodiments, device 102 may retransmit the wakeup packet to device 140 for example, in an UL OFDMA packet following the trigger frame transmission.

Figure 4:
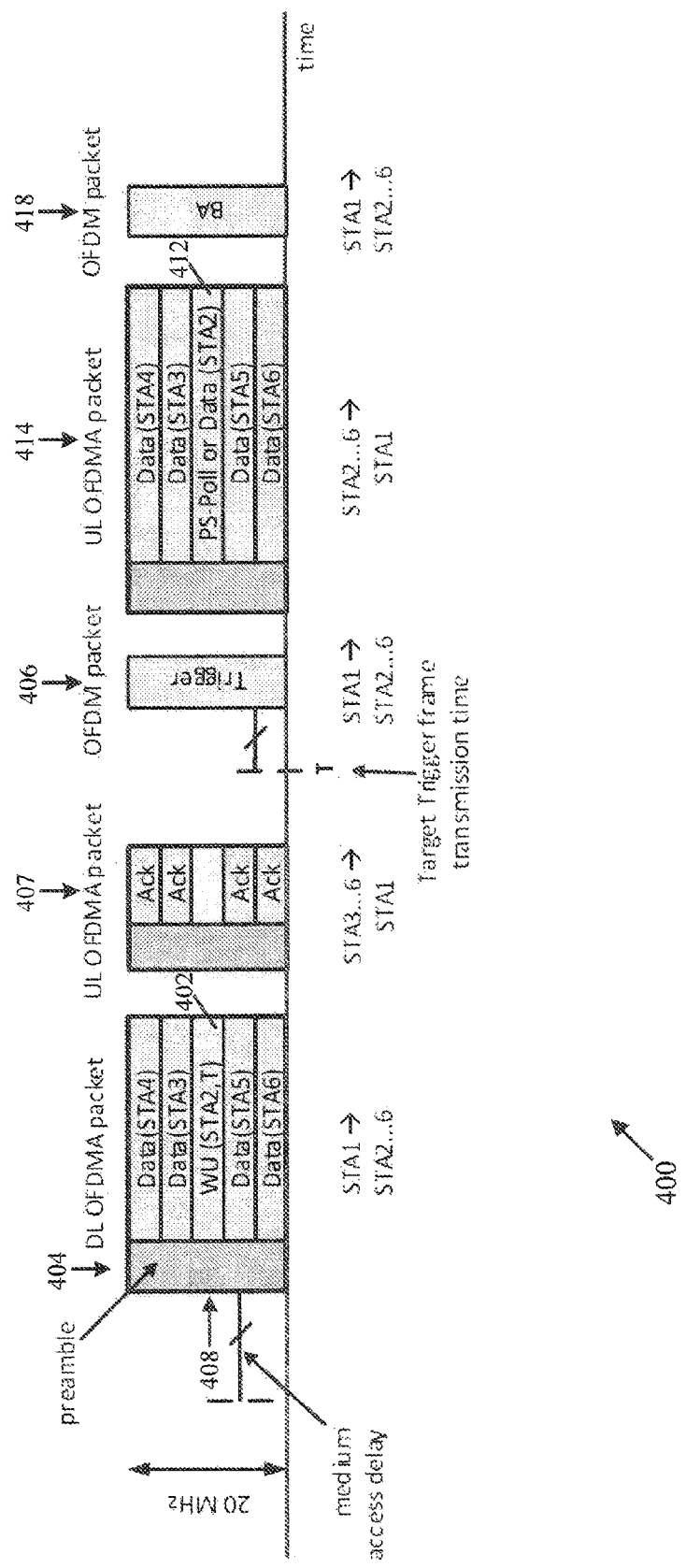
FIG. 4 is a schematic illustration of a packet exchange sequence, in accordance with some demonstrative embodiments.

Reference is made to FIG. 4, which schematically illustrates a packet exchange sequence 400, in accordance with some demonstrative embodiments.

In some demonstrative embodiments, packet exchange sequence 400 may be in accordance with an OFDMA packet response policy, e.g., as described below.

In some demonstrative embodiments, as shown in FIG. 4, a wakeup Tx STA, denoted STA1, may be configured to wake up a wakeup Rx STA, denoted STA2. For example, device 102 (FIG. 1) may perform the functionality and/or operate as the STA1, and/or device 140 (FIG. 1) may perform the functionality and/or operate as the STA2.

In some demonstrative embodiments, as shown in FIG. 4, the STA1 may set a wakeup response policy field, e.g., wakeup response policy field 324 (FIG. 3), of a wakeup packet 402 to the first value "0", for example, to indicate to the STA2 to use the OFDMA packet structure to transmit a response frame to the STA1, and to wait for a trigger frame transmission, e.g., before sending the response to the STA1.

In some demonstrative embodiments, as shown in FIG. 4, the STA1 may be configured to include in the wakeup packet trigger timing information indicating a time (T), for example, in the Frame Body field of the wakeup packet 402, e.g., frame body field 316 (FIG. 3).

In some demonstrative embodiments, the trigger timing information may be configured to indicate the time T at which a trigger frame 406 is scheduled to be transmitted, for example, to enable an LP-WUR of the STA2 to wakeup the radio of the STA2, e.g., radio 144 (FIG. 1), for example, just before the transmission of trigger frame 406.

In some demonstrative embodiments, as shown in FIG. 4, the STA1 may transmit wakeup packet 402 over sub-band 408 of a DL OFDMA packet 404.

In some demonstrative embodiments, as shown in FIG. 4, other sub-bands of DL OFDMA packet 404 may be used to transmit data to other stations, e.g., a STA3, a STA4, a STA5, and/or a STA6.

In some demonstrative embodiments, as shown in FIG. 4, the other stations, e.g., STA3, STA4, STA5 and/or STA6, may acknowledge receipt of the DL OFDMA packet 404 over an UL OFDM packet 409.

In some demonstrative embodiments, as shown in FIG. 4, the STA1 may allocate sub-band 408 for transmission of a response frame 412 from the STA2, and may schedule the transmission of trigger frame 406 at the time T.

In some demonstrative embodiments, the STA2 may be configured to wait for the trigger frame 406, e.g., at the time T.

In some demonstrative embodiments, as shown in FIG. 4, upon reception of the trigger frame 406, the STA2 may decode the sub-band allocation information in the trigger frame 406, and may transmit the response frame 412, e.g., a PS-Poll, a Null-Data frame, a Data frame, or any other response, for example, using the sub-band 408, e.g., allocated to the STA2 in the OFDMA packet 404.

In some demonstrative embodiments, as shown in FIG. 4, the STA2 may transmit response packet 412 over sub-band 408 of an UL OFDMA packet 414.

In some demonstrative embodiments, as shown in FIG. 4, other sub-bands of UL OFDMA packet 414 may be allocated to receive data from other stations, e.g., STA 3, STA 4, STA 5, and/or STA 6.

In some demonstrative embodiments, as shown in FIG. 4, the STA1 may transmit a block acknowledgement (BA) frame 418, for example, to acknowledge receipt of the response frame 412 from the STA2, and the data from the other stations.

Referring back to FIG. 1, in some demonstrative embodiments, device 102 may transmit a wakeup packet, e.g., wakeup packet 300 (FIG. 3), to a plurality of wireless devices, for example, a group of wireless devices including device 140 and one or more other wireless devices, e.g., as described below.

In one example, device 102 may transmit the wakeup packet to the plurality of wireless devices in the form of a group-addressed frame.

In some demonstrative embodiments, device 102 may transmit the wakeup packet over a wakeup RU allocation of an OFDMA structure.

In some demonstrative embodiments, the wakeup packet may include a plurality of response RU allocations of the OFDMA structure, e.g., in frame body field 316 (FIG. 3), for transmission of responses to the wakeup packet, e.g., from the plurality of wireless devices.

In some demonstrative embodiments, the wakeup packet may include trigger timing information to indicate the timing for transmission of a trigger frame to trigger the responses from the plurality of devices, e.g., in frame body field 316 (FIG. 3).

In some demonstrative embodiments, the wakeup packet may include addresses of the plurality of devices, e.g., in MAC Header field 314 (FIG. 3).

In some demonstrative embodiments, the plurality of devices may wait for the trigger frame, and upon reception of the trigger frame, a device of the plurality of devices may transmit a response over a response RU allocation of the plurality of response RU allocations allocated for the device in the OFDMA.

In one example, upon successful reception of the wakeup packet, the plurality of wireless devices may use the OFDMA packet structure to transmit the response packets, for example, simultaneously in a single OFDMA packet, e.g., as described below with reference to FIG. 5.

In some demonstrative embodiments, using the OFDMA structure to communicate one or more response packets, e.g., from a single wakeup Rx device or from a plurality of wakeup Rx devices, may, for example, improve the efficiency and utilization of the wireless network.

Figure 5:
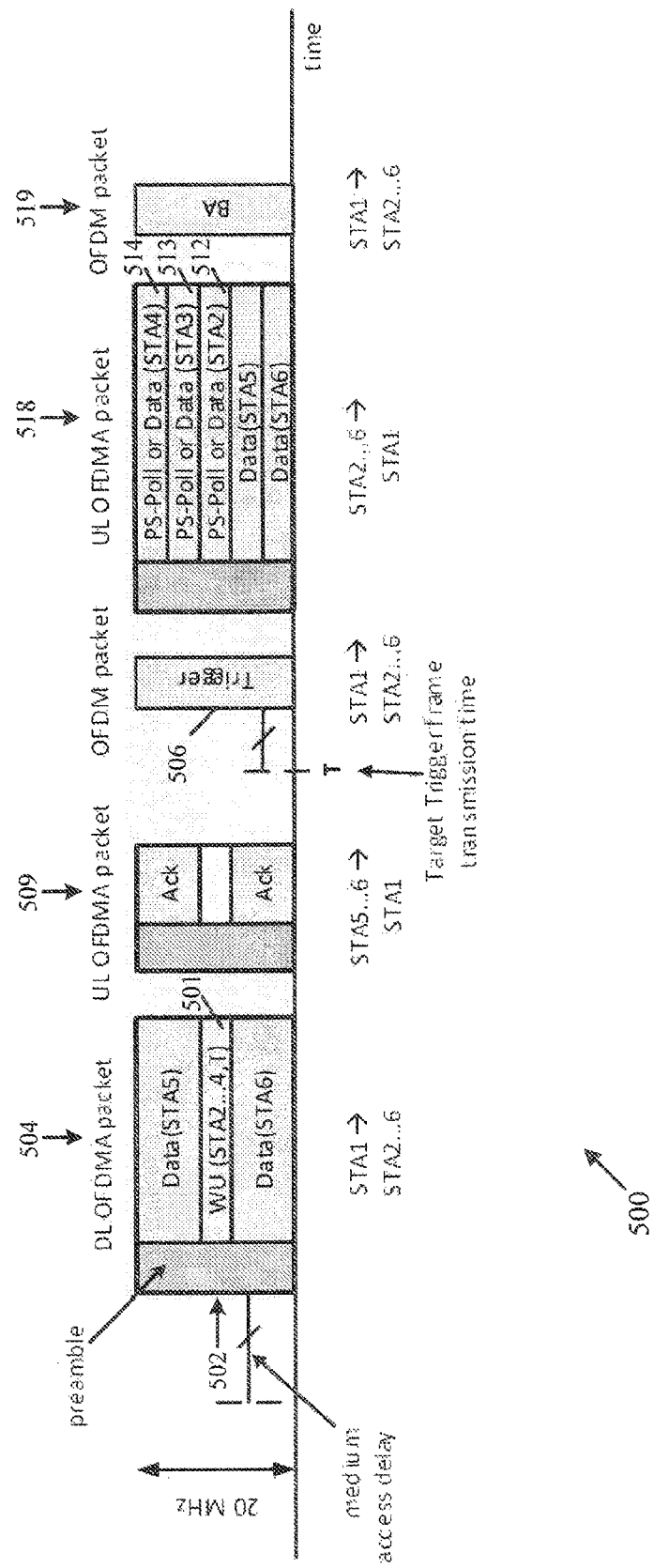
FIG. 5 is a schematic illustration of a packet exchange sequence, in accordance with some demonstrative embodiments.

Reference is made to FIG. 5, which schematically illustrates a packet exchange sequence 500, in accordance with some demonstrative embodiments.

In some demonstrative embodiments, packet exchange sequence 500 may be in accordance with an OFDMA packet response policy, e.g., as described below.

In some demonstrative embodiments, as shown in FIG. 5, a wakeup Tx STA, denoted STA1, may be configured to wake up a plurality of wakeup Rx STAs, denoted STA2, STA3, and STA4. For example, device 102 (FIG. 1) may perform the functionality and/or operate as the STA1, and/or device 140 (FIG. 1) may perform the functionality and/or operate as a STA of the STA2, STA3 and/or STA4.

In some demonstrative embodiments, as shown in FIG. 5, the STA1 may address a wakeup packet 501 to the plurality of STAs, e.g., the STA2, STA3, and STA4.

In some demonstrative embodiments, as shown in FIG. 5, the STA1 may set a wakeup response policy field, e.g., wakeup response policy field 324 (FIG. 3), of the wakeup packet 501 to the first value "0", for example, to indicate to the plurality of wakeup Rx stations to use the OFDMA packet structure to transmit responses to the STA1, and to wait for a trigger frame transmission, e.g., before sending the responses to the STA1.

In some demonstrative embodiments, as shown in FIG. 5, the STA1 may be configured to include in the wakeup packet trigger timing information, for example, in the Frame Body field of the wakeup packet 501, e.g., frame body field 316 (FIG. 3).

In some demonstrative embodiments, as shown in FIG. 5, the trigger timing information may be configured to indicate a time T at which a trigger frame 506 is scheduled to be transmitted, for example, to enable an LP-WUR of a station of the plurality of wakeup Rx stations to wakeup the radio of the station, e.g., radio 144 (FIG. 1), for example, just before the transmission of trigger frame 506.

In some demonstrative embodiments, as shown in FIG. 5, the STA1 may allocate sub-bands 512, 513 and 514 for transmission of the response frames from STA2, STA3, and STA4, respectively, and may schedule the transmission of trigger frame 506 at the time T.

In some demonstrative embodiments, as shown in FIG. 5, the STA1 may transmit wakeup packet 501 to STA2, STA3 and STA4, over sub-band 502 of a DL OFDMA packet 504.

In some demonstrative embodiments, as shown in FIG. 5, other sub-bands of DL OFDMA packet 504 may be used to transmit data to other stations, e.g., STA5, and STA6.

In some demonstrative embodiments, as shown in FIG. 5, the other stations, e.g., STA 5 and STA6, may acknowledge receipt of the DL OFDMA packet 504 over an UL OFDM packet 509.

In some demonstrative embodiments, the plurality of Rx wakeup stations, e.g., the STA2, the STA 3, and the STA4, may receive the wakeup packet 501 and may wait for the trigger frame 506.

In some demonstrative embodiments, the trigger frame 506 may include the sub-band allocations 512, 513 and 514 for the STA2, STA3, and ST4, respectively.

In some demonstrative embodiments, as shown in FIG. 5, STA2, STA3, and STA4 may transmit response frames in an UL OFDMA packet 518 following the trigger frame 506, e.g., simultaneously, for example, using the allocated sub-bands 512, 513 and 514.

In some demonstrative embodiments, as shown in FIG. 5, STA2 may transmit a response frame over sub-band 512, STA3 may transmit a response frame over sub-band 513, and/or STA4 may transmit a response frame over sub-band 514, in the UL OFDMA packet 518.

In some demonstrative embodiments, as shown in FIG. 5, other sub-bands of UL OFDMA packet 518 may be allocated to receive data from other stations, e.g., STA5 and/or STA6.

In some demonstrative embodiments, as shown in FIG. 5, the STA1 may transmit a block acknowledgement (BA) frame 519, for example, to acknowledge receipt of response frames from stations STA2, STA3 and STA4, respectively, and/or the data from STA5 and/or STA6.

Referring back to FIG. 1, in some demonstrative embodiments, controller 124 may control, cause and/or trigger device 102 to generate a wakeup packet, e.g., wakeup packet 300, to wakeup device 140.

In some demonstrative embodiments, the wakeup packet may include a value to indicate the OFDM packet response policy to be used to transmit a response to the wakeup packet. For example, the wakeup packet may include the value "1" in the wakeup response policy field 324 (FIG. 3).

In some demonstrative embodiments, the wakeup packet may include contention timing information to indicate a time for device 140 to contend wireless medium 103 to transmit the response to the wakeup packet from device 102. For example, the wakeup packet may include the contention timing information in frame body field 316 (FIG. 3).

In one example, the contention timing information may be configured to indicate a time T (target wake time) at which device 140 is to contend for the medium 103 for the transmission of the response frame, e.g., a PS-Poll, a Data frame, a Null-Data frame, and/or any other response frame.

In some demonstrative embodiments, controller 124 may control, cause and/or trigger device 102 to transmit the wakeup packet including the OFDM packet response policy over the wakeup RU allocation of the OFDMA structure.

In some demonstrative embodiments, device 140 may receive the wakeup packet from device 102 over the wakeup RU allocation of the OFDMA structure.

In some demonstrative embodiments, the wakeup packet may include the indication of the OFDM packet response policy and the contention timing information.

In some demonstrative embodiments, controller 159 may control, cause and/or trigger wakeup receiver 150 to process the wakeup packet, e.g., wakeup packet 300 (FIG. 3), received over the wakeup RU allocation.

In some demonstrative embodiments, device 140 may be configured to use the OFDM packet structure to transmit the response frame, e.g., as described below.

In some demonstrative embodiments, controller 159 and/or controller 154 may control, cause and/or trigger radio 144 to transmit to device 102 an OFDM packet including the response, e.g., when the wakeup response policy field in the wakeup packet includes the value indicating the OFDM packet response policy.

In some demonstrative embodiments, controller 159 may control, cause and/or trigger device 140 to wakeup radio 144, for example, to contend for the wireless medium 103, e.g., based on the contention timing information indicated in frame body field 316 (FIG. 3).

In some demonstrative embodiments, controller 159 may control, cause and/or trigger radio 144 to contend for wireless medium 103 to transmit the response, for example, based on the contention timing information in the wakeup packet.

In some demonstrative embodiments, device 102 may receive the response frame, e.g., in the OFDM packet.

In some demonstrative embodiments, controller 124 may control, cause and/or trigger device 102 to process a received OFDM packet including the response from device 140.

In some demonstrative embodiments, device 102 may be aware that device 140 received the wakeup packet and radio 144 is awake, for example, based on the response, and device 102 may be able to communicate data with device 140.

In some demonstrative embodiments, controller 124 may control, cause and/or trigger device 102 to retransmit the wakeup packet to device 140, for example, when the response frame is not received from device 140.

Figure 6:
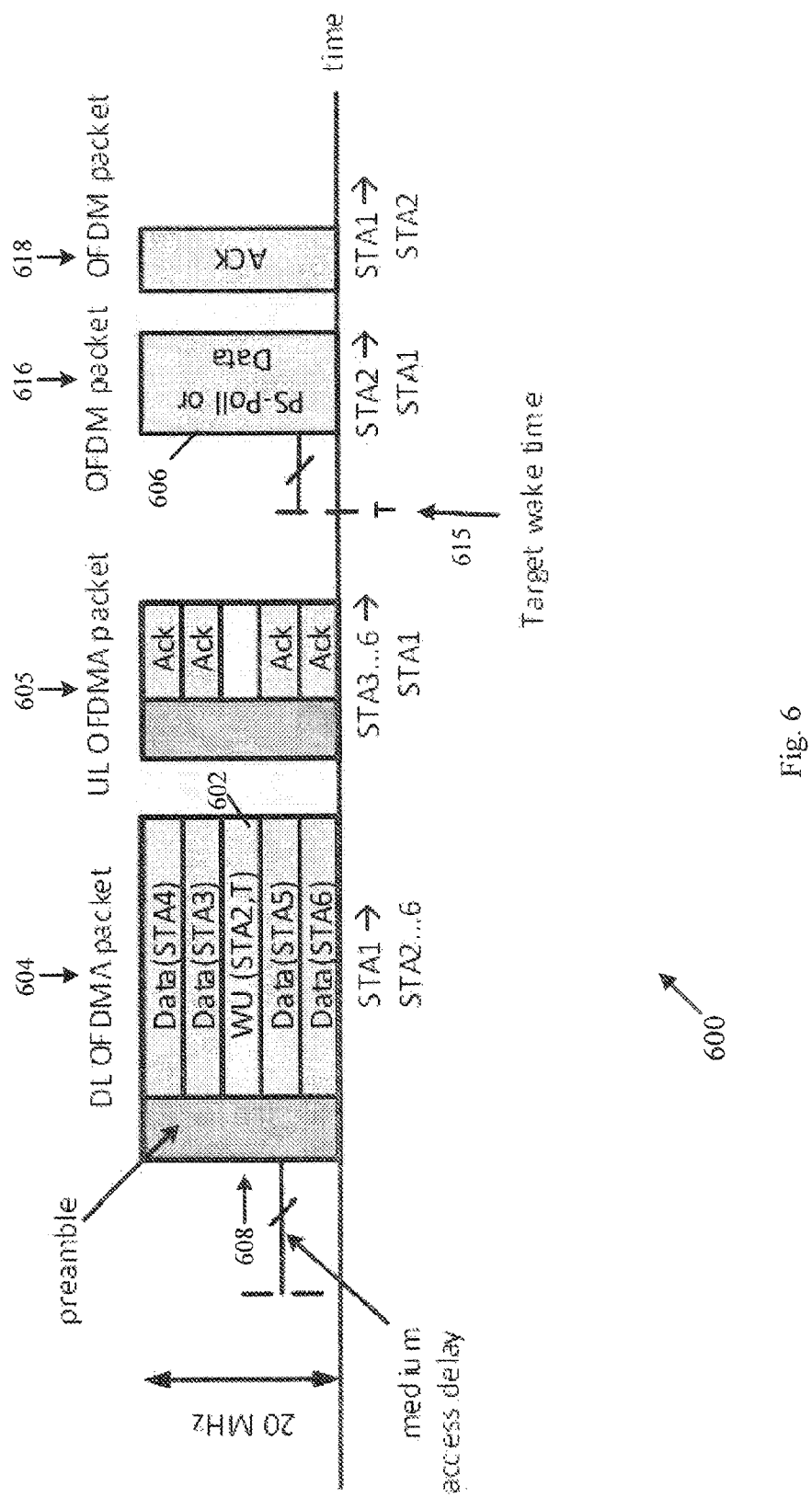
FIG. 6 is a schematic illustration of a packet exchange sequence, in accordance with some demonstrative embodiments.

Reference is made to FIG. 6, which schematically illustrates a packet exchange sequence 600, in accordance with some demonstrative embodiments.

In some demonstrative embodiments, packet exchange sequence 600 may be in accordance with an OFDM packet response policy, e.g., as described below.

In some demonstrative embodiments, packet exchange sequence 600 may include a wakeup packet transmitted in an OFDMA structure with other wireless devices and/or users of the OFDMA structure, e.g., as described below.

In some demonstrative embodiments, as shown in FIG. 6, a wakeup Tx STA, denoted STA1, may be configured to wake up at least one wakeup Rx STA, denoted STA2. For example, device 102 (FIG. 1) may perform the functionality and/or operate as the STA1, and/or device 140 (FIG. 1) may perform the functionality and/or operate as the STA2.

In some demonstrative embodiments, as shown in FIG. 6, the STA1 may transmit wakeup packet 602 over a sub-band 608 of a DL OFDMA packet 604.

In some demonstrative embodiments, as shown in FIG. 6, other sub-bands of DL OFDMA packet 604 may be allocated to transmit data from the STA1 to other stations, e.g., a STA3, a STA4, a STA5, and/or a STA6.

In some demonstrative embodiments, as shown in FIG. 6, the STA1 may set a wakeup response policy field, e.g., wakeup response policy field 324 (FIG. 3), of a wakeup packet 602 to the a value, e.g., the value "1", for example, to indicate to the STA2 to use the OFDM packet structure to transmit a response frame to the STA1.

In one example, the STA2 may use the OFDM packet structure, e.g., a 20 Megahertz (MHz) PPDU, to transmit the response frame to the STA1.

In some demonstrative embodiments, as shown in FIG. 6, the STA1 may be configured to include contention timing information in the wakeup packet 602, for example, in the Frame Body field of the wakeup packet 602, e.g., frame body field 316 (FIG. 3).

In some demonstrative embodiments, the contention timing information may be configured to indicate a time T (target wake time) at which the STA2 is to contend for the medium for the transmission of a response frame 606, e.g., a PS-Poll, a Data frame, a Null-Data frame, and/or any other response frame.

In some demonstrative embodiments, as shown in FIG. 6, the STA1 may transmit wakeup packet 602 over sub-band 608 of a DL OFDMA packet 604.

In some demonstrative embodiments, as shown in FIG. 6, other sub-bands of DL OFDMA packet 604 may be allocated to transmit data from STA1 to other stations, e.g., STA3, STA4, STA5, and/or STA6.

In some demonstrative embodiments, as shown in FIG. 6, the other stations may acknowledge receipt of the data in an UL OFDM packet 605.

In some demonstrative embodiments, as shown in FIG. 6, upon receiving the wakeup packet 602, the LP-WUR of the STA2, e.g., wakeup receiver 150 (FIG. 1), may wakeup the radio of the STA2, e.g., radio 144 (FIG. 1), for example, just before the target wake time (T) indicated by the wakeup packet 602, e.g., in frame body field 316 (FIG. 3).

In some demonstrative embodiments, as shown in FIG. 6, the radio of the STA2, e.g., radio 144 (FIG. 1), may start to contend (615) for the medium to transmit response frame 606, e.g., a PS-Poll, a Null-Data, or a Data frame, for example, in an OFDM packet 616, e.g., using the 20 MHz OFDM packet structure.

In some demonstrative embodiments, as shown in FIG. 6, the STA1 may transmit an ACK frame 618, for example, to acknowledge receipt of response frame 606, e.g., from STA2.

Figure 7:
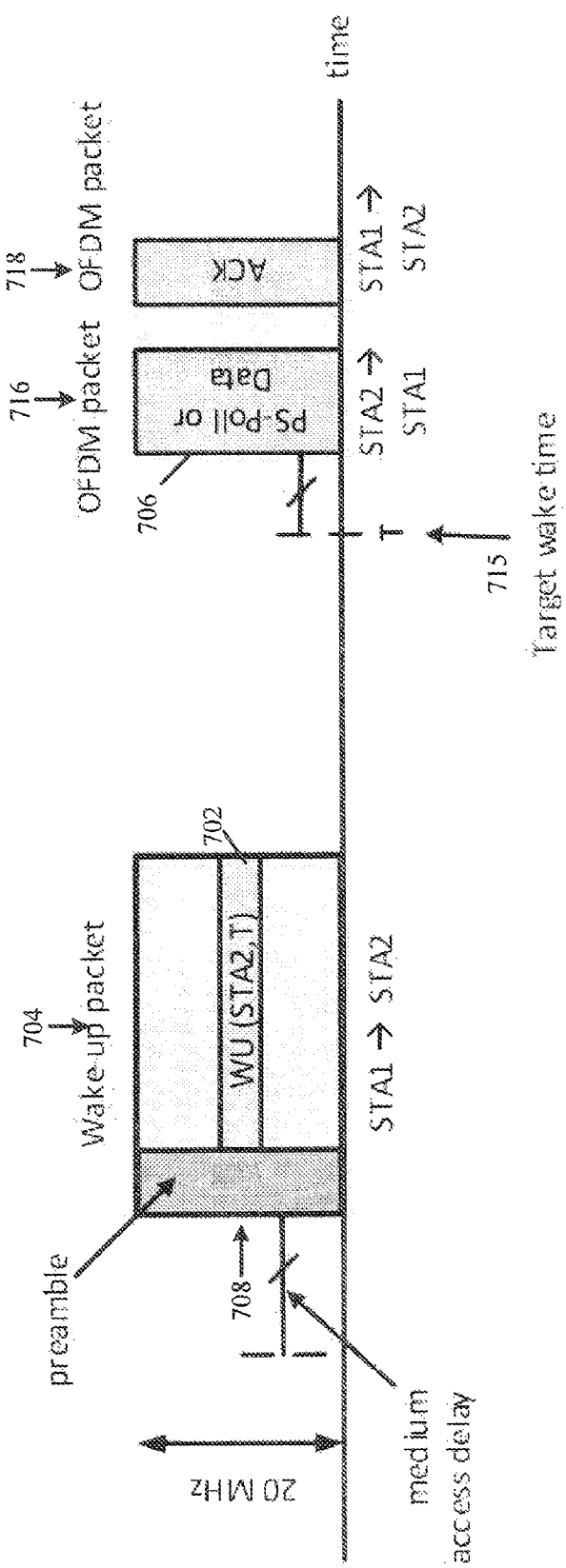
FIG. 7 is a schematic illustration of a packet exchange sequence, in accordance with some demonstrative embodiments.

Reference is made to FIG. 7, which schematically illustrates a packet exchange sequence 700, in accordance with some demonstrative embodiments.

In some demonstrative embodiments, packet exchange sequence 700 may be in accordance with an OFDM packet response policy, e.g., as described below.

In some demonstrative embodiments, packet exchange sequence 700 may be with respect to a stand-alone wakeup packet transmitted in an OFDMA structure, e.g., without any other non-wakeup users, e.g., as described below.

In some demonstrative embodiments, as shown in FIG. 7, a wakeup Tx STA, denoted STA1, may be configured to wake up a wakeup Rx STA, denoted STA2. For example, device 102 (FIG. 1) may perform the functionality and/or operate as the STA1, and/or device 140 (FIG. 1) may perform the functionality and/or operate as the STA2.

In some demonstrative embodiments, as shown in FIG. 7, the STA1 may transmit a stand-alone wakeup packet 702 over a sub-band 708 of a DL OFDMA packet 704.

In some demonstrative embodiments, as shown in FIG. 7, other sub-bands of DL OFDMA packet 704 may not be used to transmit data, e.g., to any other non-wakeup station.

In some demonstrative embodiments, as shown in FIG. 7, the STA1 may set a wakeup response policy field, e.g., wakeup response policy field 324 (FIG. 3), of wakeup packet 702 to a value, e.g., the value "1", for example, to indicate to the STA2 to use the OFDM packet structure to transmit a response frame 706 to the STA 1.

In one example, the STA2 may use an OFDM packet structure 716, e.g., a 20 Megahertz (MHz) PPDU, to transmit the response frame 706 to the STA1.

In some demonstrative embodiments, as shown in FIG. 7, upon receiving the wakeup packet 702, the LP-WUR of the STA2, e.g., wakeup receiver 150 (FIG. 1), may wakeup the radio of the STA2, e.g., radio 144 (FIG. 1), for example, just before the target wake time (T) indicated by the wakeup packet 702, e.g., in frame body field 316 (FIG. 3).

In some demonstrative embodiments, as shown in FIG. 7, the radio of the STA2, e.g., radio 144 (FIG. 1), may start to contend (715) for the medium to transmit response frame 706, e.g., a PS-Poll, a Null-Data, or a Data frame, for example, in the OFDM packet 716, e.g., the 20 MHz OFDM packet structure.

In some demonstrative embodiments, as shown in FIG. 7, the STA1 may transmit an ACK frame 718 to acknowledge receipt of response frame 706, e.g., from STA2.

Referring back to. FIG. 1, controller 124 may control, cause and/or trigger device 102 to generate a wakeup packet, e.g., wakeup packet 300, to wakeup device 140.

In some demonstrative embodiments, the wakeup packet may include a value to indicate the no response policy. For example, the wakeup packet may include the value "2" in the wakeup response policy field 324 (FIG. 3).

In one example, device 102, may set the Wakeup Response Policy field of the wakeup packet to the value "2", for example, to indicate to device 140 that device 102 is not expecting a response frame from the STA2.

In some demonstrative embodiments, device 102 may indicate the no response police, for example, when there is no data pending for device 140 at device 102, and wakeup packet is transmitted to maintain synchronization between devices 102 and 140.

In some demonstrative embodiments, device 102 may indicate the no response police, for example, when partial beacon information, e.g., BSSID, Timestamp, and/or the like, is included in the wakeup packet.

In some demonstrative embodiments, controller 124 may control, cause and/or trigger device 102 to transmit the wakeup packet over a wakeup RU allocation of an OFDMA structure, to wakeup receiver 150 of device 140.

In some demonstrative embodiments, controller 124 may control, cause and/or trigger message processor 128 to generate the wakeup packet including the wakeup response policy field indicating the no response policy, and/or controller 124 may control, cause and/or trigger transmitter 118 to transmit the wakeup packet to device 140.

In some demonstrative embodiments, device 140 may receive from device 102 the wakeup packet including the indication of the no response policy.

In some demonstrative embodiments, controller 159 may control, cause and/or trigger device 140 to select not to transmit a response frame, e.g., when the wakeup packet includes the indication of the no response policy.

Figure 8:
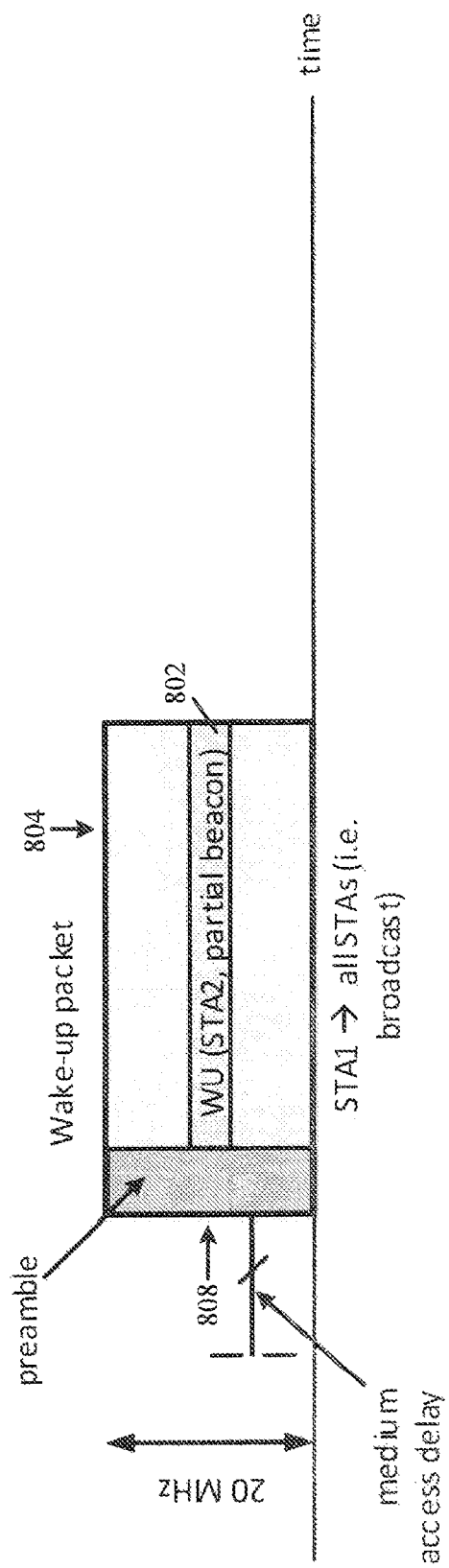
FIG. 8 is a schematic illustration of a packet exchange sequence, in accordance with some demonstrative embodiments.

Reference is made to FIG. 8, which schematically illustrates a packet exchange sequence 800, in accordance with some demonstrative embodiments.

In some demonstrative embodiments, packet exchange sequence 800 may be in accordance with a no packet response policy, e.g., as described below.

In some demonstrative embodiments, as shown in FIG. 8, a wakeup Tx STA, denoted STA1, may be configured to wake up a single wakeup Rx STA, denoted STA2. For example, device 102 (FIG. 1) may perform the functionality and/or operate as the STA1, and/or device 140 (FIG. 1) may perform the functionality and/or operate as the STA2.

In other embodiments, the STA1 may send a stand-alone wakeup packet 802, to a plurality of devices, e.g., a plurality of devices including device 140.

In some demonstrative embodiments, as shown in FIG. 8, the STA1 may transmit stand-alone wakeup packet 802 over sub-band 808 of a DL OFDMA packet 804.

In some demonstrative embodiments, as shown in FIG. 8, other sub-bands of DL OFDMA packet 804 may not be used to transmit data, e.g., to any other non-wakeup stations.

Referring back to FIG. 1, in some demonstrative embodiments, the OFDM packet response policy and the no response policy may be combined into one policy, e.g., as described below.

In some demonstrative embodiments, the Wakeup Response Policy field, e.g., wakeup response policy field 324 (FIG. 3), may include a first value, e.g., "0", to indicate the OFDMA packet response, e.g., as described above.

In some demonstrative embodiments, the Wakeup Response Policy field, e.g., wakeup response policy field 324 (FIG. 3), may include a second value, e.g., "1", to indicate the OFDM packet response policy or the no response policy.

According to these embodiments, the wakeup response policy field may use a single bit to indicate the response policy. For example, wakeup response policy field 324 (FIG. 3) may include a single bit field, e.g., instead of a two-bit field.

In some demonstrative embodiments, it may be sufficient to have only two modes of response, e.g., the OFDMA packet response mode, and the OFDM packet response/no response mode, for example, when wakeup receiver 150 and/or controller 157 are configured to decide whether or not to transmit a response, for example, based on the content of the wakeup packet.

In one example, wakeup receiver 150 and/or controller 157 may assume that the response is not needed, for example, if the wakeup packet contains at least partial beacon information. In another example, wakeup receiver 150 and/or controller 157 may assume that the response is not needed, for example, based on any additional or alternative criterion.

Figure 9:
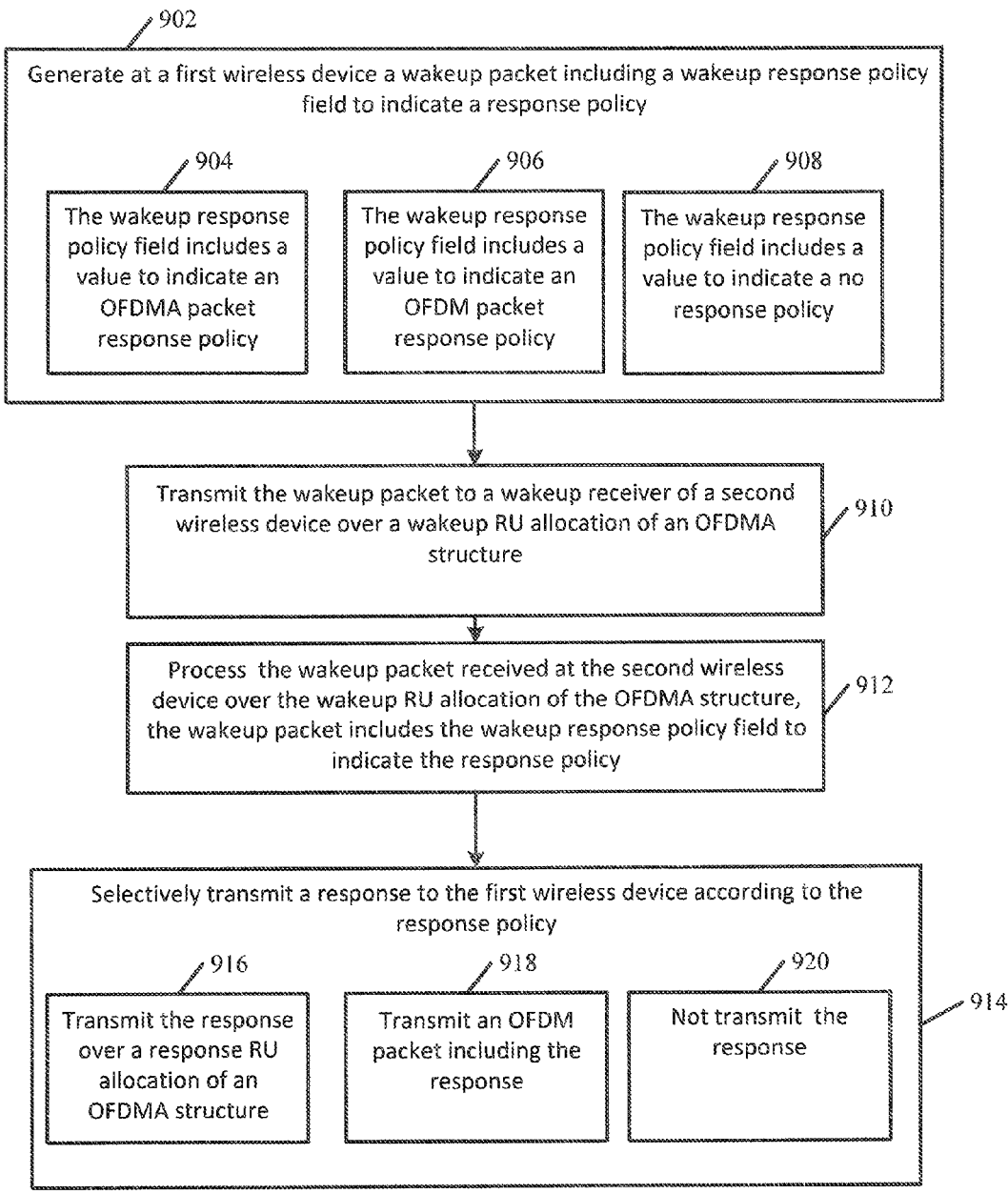
FIG. 9 is a schematic flow-chart illustration of a method of communicating a wakeup packet response, in accordance with some demonstrative embodiments.

Reference is made to FIG. 9, which schematically illustrates a method of communicating a wakeup packet response, in accordance with some demonstrative embodiments. For example, one or more of the operations of the method of FIG. 9 may be performed by one or more elements of a system, e.g., system 100 (FIG. 1), for example, one or more wireless devices, e.g., device 102 (FIG. 1), and/or device 140 (FIG. 1); a controller, e.g., controller 159 (FIG. 1), controller 124 (FIG. 1) and/or controller 154 (FIG. 1); a radio, e.g., radio 114 (FIG. 1) and/or radio 144 (FIG. 1); a transmitter, e.g., transmitter 118 and/or transmitter 148 (FIG. 1); a receiver e.g., receiver 116, receiver 156 and/or receiver 146 (FIG. 1); a wakeup receiver, e.g., wakeup receiver 150 (FIG. 1); and/or a message processor, e.g., message processor 157 (FIG. 1), message processor 128 (FIG. 1) and/or message processor 158 (FIG. 1).

As indicated at block 902, the method may include generating at a first wireless device a wakeup packet including a wakeup response policy field to indicate a response policy. For example, controller 124 (FIG. 1) may control, cause and/or trigger message processor 128 (FIG. 1) and/or radio 124 (FIG. 1) to generate the wakeup packet including the wakeup response policy field to indicate the response policy, e.g., as described above.

As indicated at block 904, generating the wakeup packet may include generating the wakeup response policy field including a value to indicate an OFDMA packet response policy. For example, controller 124 (FIG. 1) may control, cause and/or trigger message processor 128 (FIG. 1) and/or radio 124 (FIG. 1) to generate the wakeup packet including the wakeup response policy field including a first value to indicate the OFDMA packet response policy.

As indicated at block 906, generating the wakeup packet may include generating the wakeup response policy field including a value to indicate an OFDM packet response policy. For example, controller 124 (FIG. 1) may control, cause and/or trigger message processor 128 (FIG. 1) and/or radio 124 (FIG. 1) to generate the wakeup packet including the wakeup response policy field including a second value to indicate the OFDM packet response policy.

As indicated at block 908, generating the wakeup packet may include generating the wakeup response policy field including a value to indicate a no response policy. For example, controller 124 (FIG. 1) may control, cause and/or trigger message processor 128 (FIG. 1) and/or radio 124 (FIG. 1) to generate the wakeup packet including the wakeup response policy field including a third value to indicate the no response policy.

As indicated at block 910, the method may include transmitting the wakeup packet to a wakeup receiver of a second wireless device over a wakeup RU allocation of an OFDMA structure. For example, controller 124 (FIG. 1) may control, cause and/or trigger transmitter 118 (FIG. 1) to transmit the wakeup packet to wakeup receiver 150 (FIG. 1) of device 140 (FIG. 1) over a wakeup RU allocation of an OFDMA structure, e.g., as described above.

As indicated at block 912, the method may include processing the wakeup packet received from the first wireless device over the wakeup RU allocation of the OFDMA structure, and including the wakeup response policy field to indicate the response policy. For example, controller 159 (FIG. 1) may control, cause and/or trigger wake up receiver 150 (FIG. 1) to process the wakeup packet received from device 102 (FIG. 1) over the wakeup RU allocation of the OFDMA structure, e.g., as described above.

As indicated at block 914, the method may include selectively transmitting a response to the first wireless device according to the response policy. For example, controller 159 and/or controller 154 (FIG. 1) may control, cause and/or trigger device 140 (FIG. 1) to selectively transmit the response to device 102 (FIG. 1) according to the response policy, e.g., as described above.

As indicated at block 916, selectively transmitting the response to the first wireless device may include transmitting the response over a response RU allocation of an OFDMA structure. For example, controller 159 and/or controller 154 (FIG. 1) may control, cause and/or trigger radio 144 (FIG. 1) to transmit the response to device 102 (FIG. 1) according to the OFDMA response policy, e.g., as described above.

As indicated at block 918, selectively transmitting the response to the first wireless device may include transmitting an OFDM packet including the response. For example, controller 159 and/or controller 154 (FIG. 1) may control, cause and/or trigger radio 144 (FIG. 1) to transmit the OFDM packet including the response to device 102 (FIG. 1), e.g., as described above.

As indicated at block 920, selectively transmitting the response to the first wireless device may include selecting not to transmit the response. For example, controller 159 and/or controller 154 (FIG. 1) may select to control, cause and/or trigger device 140 (FIG. 1) not to transmit the response to device 102 (FIG. 1), e.g., as described above.

Figure 10:
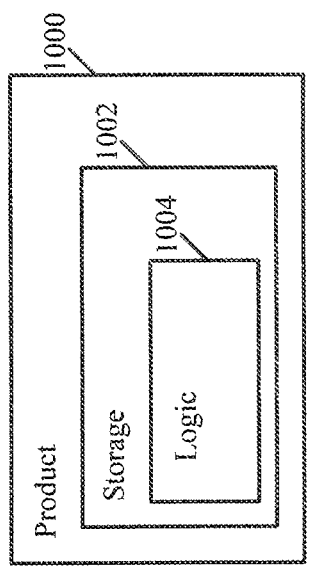
FIG. 10 is a schematic illustration of a product of manufacture, in accordance with some demonstrative embodiments.

Reference is made to FIG. 10, which schematically illustrates a product of manufacture 1000, in accordance with some demonstrative embodiments. Product 1000 may include a non-transitory machine-readable storage medium 1002 to store logic 1004, which may be used, for example, to perform at least part of the functionality of device 102 (FIG. 1), device 140 (FIG. 1), radio 114 (FIG. 1), radio 144 (FIG. 1), wakeup receiver 150 (FIG. 1), transmitter 118 (FIG. 1), transmitter 148 (FIG. 1), receiver 116 (FIG. 1), receiver 146 (FIG. 1), receiver 156 (FIG. 1), controller 124 (FIG. 1), controller 154 (FIG. 1), controller 159 (FIG. 1), message processor 128 (FIG. 1), message processor 128 (FIG. 1), and/or message processor 158 (FIG. 1), message processor 157 (FIG. 1), and/or to perform one or more operations of FIG. 4, FIG. 5, FIG. 6, FIG. 7, FIG. 8, and/or FIG. 9, and/or one or more operations described herein. The phrase "non-transitory machine-readable medium" is directed to include all computer-readable media, with the sole exception being a transitory propagating signal.

In some demonstrative embodiments, product 1000 and/or machine-readable storage medium 1002 may include one or more types of computer-readable storage media capable of storing data, including volatile memory, non-volatile memory, removable or non-removable memory, erasable or non-erasable memory, writeable or re-writeable memory, and the like. For example, machine-readable storage medium 1002 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative embodiments, logic 1004 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative embodiments, logic 1004 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further embodiments.

Example 1 includes an apparatus comprising circuitry configured to cause a first wireless device to generate a wakeup packet comprising a wakeup response policy field to indicate a response policy; and transmit the wakeup packet to a wakeup receiver of a second wireless device over a wakeup Resource Unit (RU) allocation of an Orthogonal Frequency Division Multiple Access (OFDMA) structure.

Example 2 includes the subject matter of Example 1, and optionally, wherein the apparatus is configured to cause the first wireless device to generate the wakeup response policy field comprising a value to indicate an OFDMA packet response policy, and generate the wakeup packet comprising trigger timing information; and transmit a trigger frame to the second wireless device based on the trigger timing information.

Example 3 includes the subject matter of Example 2, and optionally, wherein the apparatus is configured to cause the first wireless device to generate the wakeup packet comprising a response RU allocation of the OFDMA structure for transmission of a response to the wakeup packet.

Example 4 includes the subject matter of Example 3, and optionally, wherein the apparatus is configured to cause the first wireless device to process reception of the response over the response RU allocation of the OFDMA structure.

Example 5 includes the subject matter of Example 1, and optionally, wherein the apparatus is configured to cause the first wireless device to generate the wakeup response policy field comprising a value to indicate an Orthogonal Frequency Division Multiplexing (OFDM) packet response policy, and to generate the wakeup packet comprising contention timing information to indicate a time for the second wireless device to contend a wireless medium to transmit a response to the wakeup packet.

Example 6 includes the subject matter of Example 5, and optionally, wherein the apparatus is configured to cause the first wireless device to process a received OFDM packet including the response.

Example 7 includes the subject matter of Example 1, and optionally, wherein the apparatus is configured to cause the first wireless device to generate the wakeup response policy field comprising a value to indicate a no response policy.

Example 8 includes the subject matter of any one of Examples 1-7, and optionally, wherein the apparatus is configured to cause the first wireless device to transmit the wakeup packet to a plurality of wireless devices according to the OFDMA structure.

Example 9 includes the subject matter of any one of Examples 1-8, and optionally, wherein the apparatus is configured to cause the first wireless device to process an indication that the second wireless device is at a sleep mode, and to generate the wakeup packet to wakeup the second wireless device.

Example 10 includes the subject matter of any one of Examples 1-9, and optionally, comprising a radio to transmit the wakeup packet.

Example 11 includes the subject matter of any one of Examples 1-10, and optionally, comprising one or more antennas, a processor, and a memory.

Example 12 includes a system of wireless communication comprising a first wireless device, the first wireless device comprising one or more antennas; a processor; a memory; and a radio configured to generate a wakeup packet comprising a wakeup response policy field to indicate a response policy, and to transmit the wakeup packet to a wakeup receiver of a second wireless device over a wakeup Resource Unit (RU) allocation of an Orthogonal Frequency Division Multiple Access (OFDMA) structure.

Example 13 includes the subject matter of Example 12, and optionally, wherein the first wireless device is configured to generate the wakeup response policy field comprising a value to indicate an OFDMA packet response policy, and generate the wakeup packet comprising trigger timing information; and transmit a trigger frame to the second wireless device based on the trigger timing information.

Example 14 includes the subject matter of Example 13, and optionally, wherein the first wireless device is configured to generate the wakeup packet comprising a response RU allocation of the OFDMA structure for transmission of a response to the wakeup packet.

Example 15 includes the subject matter of Example 14, and optionally, wherein the first wireless device is configured to process reception of the response over the response RU allocation of the OFDMA structure.

Example 16 includes the subject matter of Example 12, and optionally, wherein the first wireless device is configured to generate the wakeup response policy field comprising a value to indicate an Orthogonal Frequency Division Multiplexing (OFDM) packet response policy, and to generate the wakeup packet comprising contention timing information to indicate a time for the second wireless device to contend a wireless medium to transmit a response to the wakeup packet.

Example 17 includes the subject matter of Example 16, and optionally, wherein the first wireless device is configured to process a received OFDM packet including the response.

Example 18 includes the subject matter of Example 12, and optionally, wherein the first wireless device is configured to generate the wakeup response policy field comprising a value to indicate a no response policy.

Example 19 includes the subject matter of any one of Examples 12-18, and optionally, wherein the first wireless device is configured to transmit the wakeup packet to a plurality of wireless devices according to the OFDMA structure.

Example 20 includes the subject matter of any one of Examples 12-19, and optionally, wherein the first wireless device is configured to process an indication that the second wireless device is at a sleep mode, and to generate the wakeup packet to wakeup the second wireless device.

Example 21 includes a method to be performed by a first wireless device, the method comprising generating a wakeup packet comprising a wakeup response policy field to indicate a response policy; and transmitting the wakeup packet to a wakeup receiver of a second wireless device over a wakeup Resource Unit (RU) allocation of an Orthogonal Frequency Division Multiple Access (OFDMA) structure.

Example 22 includes the subject matter of Example 21, and optionally, comprising generating the wakeup response policy field comprising a value to indicate an OFDMA packet response policy, and generating the wakeup packet comprising trigger timing information; and transmitting a trigger frame to the second wireless device based on the trigger timing information.

Example 23 includes the subject matter of Example 22, and optionally, comprising generating the wakeup packet comprising a response RU allocation of the OFDMA structure for transmission of a response to the wakeup packet.

Example 24 includes the subject matter of Example 23, and optionally, comprising processing reception of the response over the response RU allocation of the OFDMA structure.

Example 25 includes the subject matter of Example 21, and optionally, comprising generating the wakeup response policy field comprising a value to indicate an Orthogonal Frequency Division Multiplexing (OFDM) packet response policy, and generating the wakeup packet comprising contention timing information to indicate a time for the second wireless device to contend a wireless medium to transmit a response to the wakeup packet.

Example 26 includes the subject matter of Example 25, and optionally, comprising processing a received OFDM packet including the response.

Example 27 includes the subject matter of Example 21, and optionally, comprising generating the wakeup response policy field comprising a value to indicate a no response policy.

Example 28 includes the subject matter of any one of Examples 21-27, and optionally, comprising transmitting the wakeup packet to a plurality of wireless devices according to the OFDMA structure.

Example 29 includes the subject matter of any one of Examples 21-28, and optionally, comprising processing an indication that the second wireless device is at a sleep mode, and generating the wakeup packet to wakeup the second wireless device.

Example 30 includes a product comprising one or more tangible computer-readable non-transitory storage media comprising computer-executable instructions operable to, when executed by at least one computer processor, enable the at least one computer processor to implement one or more operations at a first wireless device, the operations comprising generating a wakeup packet comprising a wakeup response policy field to indicate a response policy; and transmitting the wakeup packet to a wakeup receiver of a second wireless device, over a wakeup Resource Unit (RU) allocation of an Orthogonal Frequency Division Multiple Access (OFDMA) structure.

Example 31 includes the subject matter of Example 30, and optionally, wherein the operations comprise generating the wakeup response policy field comprising a value to indicate an OFDMA packet response policy, and generating the wakeup packet comprising trigger timing information; and transmitting a trigger frame to the second wireless device based on the trigger timing information.

Example 32 includes the subject matter of Example 31, and optionally, wherein the operations comprise generating the wakeup packet comprising a response RU allocation of the OFDMA structure for transmission of a response to the wakeup packet.

Example 33 includes the subject matter of Example 32, and optionally, wherein the operations comprise processing reception of the response over the response RU allocation of the OFDMA structure.

Example 34 includes the subject matter of Example 30, and optionally, wherein the operations comprise generating the wakeup response policy field comprising a value to indicate an Orthogonal Frequency Division Multiplexing (OFDM) packet response policy, and generating the wakeup packet comprising contention timing information to indicate a time for the second wireless device to contend a wireless medium to transmit a response to the wakeup packet.

Example 35 includes the subject matter of Example 34, and optionally, wherein the operations comprise processing a received OFDM packet including the response.

Example 36 includes the subject matter of Example 30, and optionally, wherein the operations comprise generating the wakeup response policy field comprising a value to indicate a no response policy.

Example 37 includes the subject matter of any one of Examples 30-36, and optionally, wherein the operations comprise transmitting the wakeup packet to a plurality of wireless devices according to the OFDMA structure.

Example 38 includes the subject matter of any one of Examples 30-37, and optionally, wherein the operations comprise processing an indication that the second wireless device is at a sleep mode, and generating the wakeup packet to wakeup the second wireless device.

Example 39 includes an apparatus of wireless communication by a first wireless device, the apparatus comprising means for generating a wakeup packet comprising a wakeup response policy field to indicate a response policy; and means for transmitting the wakeup packet to a wakeup receiver of a second wireless device over a wakeup Resource Unit (RU) allocation of an Orthogonal Frequency Division Multiple Access (OFDMA) structure.

Example 40 includes the subject matter of Example 39, and optionally, comprising means for generating the wakeup response policy field comprising a value to indicate an OFDMA packet response policy, and generating the wakeup packet comprising trigger timing information; and means for transmitting a trigger frame to the second wireless device based on the trigger timing information.

Example 41 includes the subject matter of Example 40, and optionally, comprising means for generating the wakeup packet comprising a response RU allocation of the OFDMA structure for transmission of a response to the wakeup packet.

Example 42 includes the subject matter of Example 41, and optionally, comprising means for processing reception of the response over the response RU allocation of the OFDMA structure.

Example 43 includes the subject matter of Example 39, and optionally, comprising means for generating the wakeup response policy field comprising a value to indicate an Orthogonal Frequency Division Multiplexing (OFDM) packet response policy, and generating the wakeup packet comprising contention timing information to indicate a time for the second wireless device to contend a wireless medium to transmit a response to the wakeup packet.

Example 44 includes the subject matter of Example 43, and optionally, comprising means for processing a received OFDM packet including the response.

Example 45 includes the subject matter of Example 39, and optionally, comprising means for generating the wakeup response policy field comprising a value to indicate a no response policy.

Example 46 includes the subject matter of any one of Examples 39-45, and optionally, comprising means for transmitting the wakeup packet to a plurality of wireless devices according to the OFDMA structure.

Example 47 includes the subject matter of any one of Examples 39-46, and optionally, comprising means for processing an indication that the second wireless device is at a sleep mode, and generating the wakeup packet to wakeup the second wireless device.

Example 48 includes an apparatus comprising circuitry configured to cause a first wireless device to process a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy; selectively transmit a response to the second wireless device according to the response policy; and wakeup a transceiver to communicate data with the second wireless device.

Example 49 includes the subject matter of Example 48, and optionally, wherein the apparatus is configured to cause the first wireless device to transmit the response over a response RU allocation of the OFDMA structure, when the wakeup response policy field comprises a value to indicate an OFDMA packet response policy, and the wakeup packet comprises the response RU allocation of the OFDMA structure.

Example 50 includes the subject matter of Example 49, and optionally, wherein the apparatus is configured to cause the first wireless device to wakeup the transceiver to receive a trigger frame transmission from the second wireless device based on trigger timing information in the wakeup packet, and to transmit the response frame in response to the trigger frame.

Example 51 includes the subject matter of Example 48, and optionally, wherein the apparatus is configured to cause the first wireless device to transmit to the second wireless device an Orthogonal Frequency Division Multiplexing (OFDM) packet including the response, when the wakeup response policy field comprises a value to indicate an OFDM packet response policy.

Example 52 includes the subject matter of Example 51, and optionally, wherein the apparatus is configured to cause the first wireless device to contend for a wireless medium to transmit the response based on contention timing information in the wakeup packet.

Example 53 includes the subject matter of Example 52, and optionally, wherein the apparatus is configured to cause the first wireless device to wakeup the transceiver to contend for the wireless medium based on the contention timing information.

Example 54 includes the subject matter of Example 48, and optionally, wherein the apparatus is configured to cause the first wireless device to select not to transmit the response, when the wakeup response policy field comprises a value to indicate a no response policy.

Example 55 includes the subject matter of any one of Examples 48-54, and optionally, wherein the apparatus is configured to cause the first wireless device to process the wakeup packet, when the transceiver is at a sleep mode.

Example 56 includes the subject matter of any one of Examples 48-55, and optionally, wherein the response comprises a Power Save (PS) Poll frame, a data frame, or a Null data frame.

Example 57 includes the subject matter of any one of Examples 48-56, and optionally, comprising a wakeup receiver to receive the wakeup packet.

Example 58 includes the subject matter of any one of Examples 48-57, and optionally, comprising the transceiver.

Example 59 includes the subject matter of any one of Examples 48-58, and optionally, comprising one or more antennas, a processor, and a memory.

Example 60 includes a system of wireless communication comprising a first wireless device, the first wireless device comprising one or more antennas; a processor; a memory; a transceiver; and a wakeup receiver configured to process a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy; to selectively cause the transceiver to transmit a response to the second wireless device according to the response policy, and to wakeup the transceiver to communicate data with the second wireless device.

Example 61 includes the subject matter of Example 60, and optionally, wherein the first wireless device is configured to transmit the response over a response RU allocation of the OFDMA structure, when the wakeup response policy field comprises a value to indicate an OFDMA packet response policy, and the wakeup packet comprises the response RU allocation of the OFDMA structure.

Example 62 includes the subject matter of Example 61, and optionally, wherein the first wireless device is configured to wakeup the transceiver to receive a trigger frame transmission from the second wireless device based on trigger timing information in the wakeup packet, and to transmit the response frame in response to the trigger frame.

Example 63 includes the subject matter of Example 60, and optionally, wherein the first wireless device is configured to transmit to the second wireless device an Orthogonal Frequency Division Multiplexing (OFDM) packet including the response, when the wakeup response policy field comprises a value to indicate an OFDM packet response policy.

Example 64 includes the subject matter of Example 63, and optionally, wherein the first wireless device is configured to contend for a wireless medium to transmit the response based on contention timing information in the wakeup packet.

Example 65 includes the subject matter of Example 64, and optionally, wherein the first wireless device is configured to wakeup the transceiver to contend for the wireless medium based on the contention timing information.

Example 66 includes the subject matter of Example 60, and optionally, wherein the first wireless device is configured to select not to transmit the response, when the wakeup response policy field comprises a value to indicate a no response policy.

Example 67 includes the subject matter of any one of Examples 60-66, and optionally, wherein the first wireless device is configured to process the wakeup packet, when the transceiver is at a sleep mode.

Example 68 includes the subject matter of any one of Examples 60-67, and optionally, wherein the response comprises a Power Save (PS) Poll frame, a data frame, or a Null data frame.

Example 69 includes a method to be performed by a first wireless device, the method comprising processing a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy; selectively transmitting a response to the second wireless device according to the response policy; and waking up a transceiver to communicate data with the second wireless device.

Example 70 includes the subject matter of Example 69, and optionally, comprising transmitting the response over a response RU allocation of the OFDMA structure, when the wakeup response policy field comprises a value to indicate an OFDMA packet response policy, and the wakeup packet comprises the response RU allocation of the OFDMA structure.

Example 71 includes the subject matter of Example 70, and optionally, comprising waking up the transceiver to receive a trigger frame transmission from the second wireless device based on trigger timing information in the wakeup packet, and transmitting the response frame in response to the trigger frame.

Example 72 includes the subject matter of Example 69, and optionally, comprising transmitting to the second wireless device an Orthogonal Frequency Division Multiplexing (OFDM) packet including the response, when the wakeup response policy field comprises a value to indicate an OFDM packet response policy.

Example 73 includes the subject matter of Example 72, and optionally, comprising contending for a wireless medium to transmit the response based on contention timing information in the wakeup packet.

Example 74 includes the subject matter of Example 73, and optionally, comprising waking up the transceiver to contend for the wireless medium based on the contention timing information.

Example 75 includes the subject matter of Example 69, and optionally, comprising selecting not to transmit the response, when the wakeup response policy field comprises a value to indicate a no response policy.

Example 76 includes the subject matter of any one of Examples 69-75, and optionally, comprising processing the wakeup packet, when the transceiver is at a sleep mode.

Example 77 includes the subject matter of any one of Examples 69-76, and optionally, wherein the response comprises a Power Save (PS) Poll frame, a data frame, or a Null data frame.

Example 78 includes a product comprising one or more tangible computer-readable non-transitory storage media comprising computer-executable instructions operable to, when executed by at least one computer processor, enable the at least one computer processor to implement one or more operations at a first wireless device, the operations comprising processing a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy; selectively transmitting a response to the second wireless device according to the response policy; and waking up a transceiver to communicate data with the second wireless device.

Example 79 includes the subject matter of Example 78, and optionally, wherein the operations comprise transmitting the response over a response RU allocation of the OFDMA structure, when the wakeup response policy field comprises a value to indicate an OFDMA packet response policy, and the wakeup packet comprises the response RU allocation of the OFDMA structure.

Example 80 includes the subject matter of Example 79, and optionally, wherein the operations comprise waking up the transceiver to receive a trigger frame transmission from the second wireless device based on trigger timing information in the wakeup packet, and transmitting the response frame in response to the trigger frame.

Example 81 includes the subject matter of Example 78, and optionally, wherein the operations comprise transmitting to the second wireless device an Orthogonal Frequency Division Multiplexing (OFDM) packet including the response, when the wakeup response policy field comprises a value to indicate an OFDM packet response policy.

Example 82 includes the subject matter of Example 81, and optionally, wherein the operations comprise contending for a wireless medium to transmit the response based on contention timing information in the wakeup packet.

Example 83 includes the subject matter of Example 82, and optionally, wherein the operations comprise waking up the transceiver to contend for the wireless medium based on the contention timing information.

Example 84 includes the subject matter of Example 78, and optionally, wherein the operations comprise selecting not to transmit the response, when the wakeup response policy field comprises a value to indicate a no response policy.

Example 85 includes the subject matter of any one of Examples 78-84, and optionally, wherein the operations comprise processing the wakeup packet, when the transceiver is at a sleep mode.

Example 86 includes the subject matter of any one of Examples 78-85, and optionally, wherein the response comprises a Power Save (PS) Poll frame, a data frame, or a Null data frame.

Example 87 includes an apparatus of wireless communication by a first wireless device, the apparatus comprising means for processing a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy; means for selectively transmitting a response to the second wireless device according to the response policy; and means for waking up a transceiver to communicate data with the second wireless device.

Example 88 includes the subject matter of Example 87, and optionally, comprising means for transmitting the response over a response RU allocation of the OFDMA structure, when the wakeup response policy field comprises a value to indicate an OFDMA packet response policy, and the wakeup packet comprises the response RU allocation of the OFDMA structure.

Example 89 includes the subject matter of Example 88, and optionally, comprising means for waking up the transceiver to receive a trigger frame transmission from the second wireless device based on trigger timing information in the wakeup packet, and transmitting the response frame in response to the trigger frame.

Example 90 includes the subject matter of Example 87, and optionally, comprising means for transmitting to the second wireless device an Orthogonal Frequency Division Multiplexing (OFDM) packet including the response, when the wakeup response policy field comprises a value to indicate an OFDM packet response policy.

Example 91 includes the subject matter of Example 90, and optionally, comprising means for contending for a wireless medium to transmit the response based on contention timing information in the wakeup packet.

Example 92 includes the subject matter of Example 91, and optionally, comprising means for waking up the transceiver to contend for the wireless medium based on the contention timing information.

Example 93 includes the subject matter of Example 87, and optionally, comprising means for selecting not to transmit the response, when the wakeup response policy field comprises a value to indicate a no response policy.

Example 94 includes the subject matter of any one of Examples 87-93, and optionally, comprising means for processing the wakeup packet, when the transceiver is at a sleep mode.

Example 95 includes the subject matter of any one of Examples 87-94, and optionally, wherein the response comprises a Power Save (PS) Poll frame, a data frame, or a Null data frame.

Functions, operations, components and/or features described herein with reference to one or more embodiments, may be combined with, or may be utilized in combination with, one or more other functions, operations, components and/or features described herein with reference to one or more other embodiments, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a memory; and
a processor configured to cause a first wireless device to:
generate a wakeup packet comprising trigger timing information and a wakeup response policy field to indicate a response policy, the wakeup response policy field comprising a value to indicate an Orthogonal Frequency Division Multiple Access (OFDMA) packet response policy, the wakeup packet comprising a response Resource Unit (RU) allocation of an OFDMA structure for transmission of a response to said wakeup packet;
transmit the wakeup packet to a wakeup receiver of a second wireless device over a wakeup RU allocation of the OFDMA structure, the wakeup packet to indicate that a radio of the second wireless device is to be woken up, the OFDMA structure comprising the wakeup RU allocation and a plurality of other RU allocations, the wakeup RU allocation allocated for communication of the wakeup packet, the plurality of other RU allocations allocated for OFDMA communication of one or more data packets;
transmit a trigger frame to the second wireless device based on the trigger timing information; and
process reception of said response over the response RU allocation of the OFDMA structure.

2. The apparatus of claim 1, wherein the wakeup RU allocation comprises one or more sub-bands at a center of an OFDMA channel, and the plurality of other RU allocations comprises one or more other sub-bands of the OFDMA channel.

3. The apparatus of claim 1 configured to cause the first wireless device to transmit the wakeup packet to a plurality of wireless devices according to the OFDMA structure.

4. The apparatus of claim 1 configured to cause the first wireless device to process an indication that said second wireless device is at a sleep mode, and to generate said wakeup packet to wakeup said second wireless device.

5. The apparatus of claim 1 comprising a radio to transmit said wakeup packet.

6. The apparatus of claim 1 comprising one or more antennas, a processor, and a memory.

7. An apparatus comprising:
a memory; and
a processor configured to cause a first wireless device to:
generate a wakeup packet comprising a wakeup response policy field to indicate a response policy, the wakeup response policy field comprising a value to indicate an Orthogonal Frequency Division Multiplexing (OFDM) packet response policy, the wakeup packet comprising contention timing information to indicate a time for a second wireless device to contend a wireless medium to transmit a response to the wakeup packet;
transmit the wakeup packet to a wakeup receiver of the second wireless device over a wakeup Resource Unit (RU) allocation of an Orthogonal Frequency Division Multiple Access (OFDMA) structure, the wakeup packet to indicate that a radio of the second wireless device is to be woken up, the OFDMA structure comprising the wakeup RU allocation and a plurality of other RU allocations, the wakeup RU allocation allocated for communication of the wakeup packet, the plurality of other RU allocations allocated for OFDMA communication of one or more data packets; and
process a received OFDM packet including said response.

8. The apparatus of claim 7 configured to cause the first wireless device to transmit the wakeup packet to a plurality of wireless devices according to the OFDMA structure.

9. The apparatus of claim 7 comprising a radio to transmit said wakeup packet.

10. The apparatus of claim 7, wherein the wakeup RU allocation comprises one or more sub-bands at a center of an OFDMA channel, and the plurality of other RU allocations comprises one or more other sub-bands of the OFDMA channel.

11. The apparatus of claim 7 configured to cause the first wireless device to process an indication that said second wireless device is at a sleep mode, and to generate said wakeup packet to wakeup said second wireless device.

12. A product comprising one or more tangible computer-readable non-transitory storage media comprising computer-executable instructions operable to, when executed by at least one processor, enable the at least one processor to cause a first wireless device to:
generate a wakeup packet comprising trigger timing information and a wakeup response policy field to indicate a response policy, the wakeup response policy field comprising a value to indicate an Orthogonal Frequency Division Multiple Access (OFDMA) packet response policy, the wakeup packet comprising a response Resource Unit (RU) allocation of an OFDMA structure for transmission of a response to said wakeup packet;
transmit the wakeup packet to a wakeup receiver of a second wireless device, over a wakeup RU allocation of the OFDMA structure, the wakeup packet to indicate that a radio of the second wireless device is to be woken up, the OFDMA structure comprising the wakeup RU allocation and a plurality of other RU allocations, the wakeup RU allocation allocated for communication of the wakeup packet, the plurality of other RU allocations allocated for OFDMA communication of one or more data packets;
transmit a trigger frame to the second wireless device based on the trigger timing information; and
process reception of said response over the response RU allocation of the OFDMA structure.

13. The product of claim 12, wherein the wakeup RU allocation comprises one or more sub-bands at a center of an OFDMA channel, and the plurality of other RU allocations comprises one or more other sub-bands of the OFDMA channel.

14. An apparatus comprising:
a memory; and
a processor configured to cause a first wireless device to:
process at a wakeup receiver of the first wireless device a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy, the OFDMA structure comprising the wakeup RU allocation and a plurality of other RU allocations, the wakeup RU allocation allocated for communication of the wakeup packet, the plurality of other RU allocations allocated for OFDMA communication of one or more data packets;

selectively transmit a response to the second wireless device according to the response policy; and wakeup a transceiver of the first wireless device to communicate data with said second wireless device, wherein the processor is configured to, when the wakeup response policy field comprises a value to indicate an OFDMA packet response policy, cause the first wireless device to wakeup said transceiver to receive a trigger frame transmission from said second wireless device based on trigger timing information in said wakeup packet, and, in response to said trigger frame, to transmit the response to the second wireless device over a response RU allocation of the OFDMA structure.

15. The apparatus of claim 14, wherein the wakeup RU allocation comprises one or more sub-bands at a center of an OFDMA channel, and the plurality of other RU allocations comprises one or more other sub-bands of the OFDMA channel.

16. The apparatus of claim 14 configured to cause the first wireless device to select not to transmit said response, when the wakeup response policy field comprises a value to indicate a no response policy.

17. The apparatus of claim 14 configured to cause the first wireless device to process said wakeup packet, when said transceiver is at a sleep mode.

18. The apparatus of claim 14 comprising the wakeup receiver to receive said wakeup packet.

19. The apparatus of claim 14 comprising one or more antennas, a processor, and a memory.

20. An apparatus comprising:
a memory; and
a processor configured to cause a first wireless device to:
process at a wakeup receiver of the first wireless device a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy, the OFDMA structure comprising the wakeup RU allocation and a plurality of other RU allocations, the wakeup RU allocation allocated for communication of the wakeup packet, the plurality of other RU allocations allocated for OFDMA communication of one or more data packets;
selectively transmit a response to the second wireless device according to the response policy; and
wakeup a transceiver of the first wireless device to communicate data with said second wireless device,
wherein the processor is configured to, when the wakeup response policy field comprises a value to indicate an Orthogonal Frequency Division Multiplexing (OFDM) packet response policy, cause the first wireless device to contend for a wireless medium to transmit said response based on contention timing information in the wakeup packet, and to transmit to the second wireless device an OFDM packet including the response.

21. The apparatus of claim 20 configured to cause the first wireless device to select not to transmit said response, when the wakeup response policy field comprises a value to indicate a no response policy.

22. The apparatus of claim 20, wherein the wakeup RU allocation comprises one or more sub-bands at a center of an OFDMA channel, and the plurality of other RU allocations comprises one or more other sub-bands of the OFDMA channel.

23. The apparatus of claim 20 configured to cause the first wireless device to wakeup said transceiver to contend for said wireless medium based on said contention timing information.

24. A product comprising one or more tangible computer-readable non-transitory storage media comprising computer-executable instructions operable to, when executed by at least one processor, enable the at least one processor to cause a first wireless device to:
process at a wakeup receiver of the first wireless device a wakeup packet received from a second wireless device over a wakeup Resource Unit (RU) allocation of an Orthogonal Frequency Division Multiple Access (OFDMA) structure, the wakeup packet comprising a wakeup response policy field to indicate a response policy, the OFDMA structure comprising the wakeup RU allocation and a plurality of other RU allocations, the wakeup RU allocation allocated for communication of the wakeup packet, the plurality of other RU allocations allocated for OFDMA communication of one or more data packets;
selectively transmit a response to the second wireless device according to the response policy; and
wake up a transceiver of the first wireless device to communicate data with said second wireless device,
wherein the instructions, when executed, enable the processor to, when the wakeup response policy field comprises a value to indicate an OFDMA packet response policy, cause the first wireless device to wakeup said transceiver to receive a trigger frame transmission from said second wireless device based on trigger timing information in said wakeup packet, and, in response to said trigger frame, to transmit the response to the second wireless device over a response RU allocation of the OFDMA structure.

25. The product of claim 24, wherein the wakeup RU allocation comprises one or more sub-bands at a center of an OFDMA channel, and the plurality of other RU allocations comprises one or more other sub-bands of the OFDMA channel.

* * * * *